US012475630B2

(12) United States Patent
Xiao et al.

(10) Patent No.: US 12,475,630 B2
(45) Date of Patent: Nov. 18, 2025

(54) IMAGE RENDERING METHOD AND RELATED APPARATUS

(71) Applicant: Tencent Technology (Shenzhen) Company Limited, Guangdong (CN)

(72) Inventors: Chunhui Xiao, Shenzhen (CN); Qingchao Hu, Shenzhen (CN); Ge Guan, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 243 days.

(21) Appl. No.: 18/199,653

(22) Filed: May 19, 2023

(65) Prior Publication Data
US 2023/0298252 A1    Sep. 21, 2023

Related U.S. Application Data

(63) Continuation of application No. PCT/CN2022/117718, filed on Sep. 8, 2022.

(30) Foreign Application Priority Data

Oct. 20, 2021    (CN) .......................... 202111218899.0

(51) Int. Cl.
  *G06T 15/04*    (2011.01)
  *G06T 7/73*    (2017.01)
(52) U.S. Cl.
  CPC ................ *G06T 15/04* (2013.01); *G06T 7/75* (2017.01); *G06T 2210/56* (2013.01)
(58) Field of Classification Search
  CPC ....... G06T 15/04; G06T 7/75; G06T 2210/56; G06T 17/05; G06T 11/206; G06T 11/001; G06T 1/20

(Continued)

(56) References Cited

U.S. PATENT DOCUMENTS 6,097,397 A * 8/2000 Lee .......................... G06T 15/04
                                                          345/586
6,400,370 B1 * 6/2002 Lee .......................... G06T 15/04
                                                          345/586

(Continued)

FOREIGN PATENT DOCUMENTS

| CN | 107832369 A | 3/2018 |
| CN | 109191550 A | 1/2019 |
| CN | 113658296 A | 11/2021 |

OTHER PUBLICATIONS

International Search Report and Written Opinion issued Nov. 28, 2022 in Application No. PCT/CN2022/117718, pp. 1-16.

*Primary Examiner* — Prabodh M Dharia
(74) *Attorney, Agent, or Firm* — ArentFox Schiff LLP

(57) ABSTRACT

An image rendering method includes obtaining texture data corresponding to a particle road condition map in which particle movement simulates vehicle movement reflecting road traffic conditions. The texture data includes texel data corresponding to each road section in the particle road condition map, and the texel data includes location data of reference sampling points on a corresponding road section in the particle road condition map. The method further includes determining, during rendering of each frame of the particle road condition map, location data of each particle in the particle road condition map according to an animation running time corresponding to the respective frame and according to the location data of the reference sampling points, and rendering the respective frame corresponding to the animation running time in the particle road condition map according to the location data of each particle at the animation running time.

20 Claims, 7 Drawing Sheets

(58) Field of Classification Search
USPC ..... 345/418, 440, 586; 701/118; 340/995.13
See application file for complete search history.

(56) References Cited

U.S. PATENT DOCUMENTS

| | | | | |
|---|---|---|---|---|
| 7,274,311 | B1* | 9/2007 | MacLeod | G08G 1/096716 |
| | | | | 340/995.13 |
| 2004/0046759 | A1* | 3/2004 | Soulchin | G06T 17/05 |
| | | | | 345/440 |
| 2006/0247846 | A1* | 11/2006 | Cera | G08G 1/09 |
| | | | | 701/118 |
| 2019/0377981 | A1* | 12/2019 | Veeravasarapu | G06T 15/20 |
| 2021/0001861 | A1* | 1/2021 | Lobey | B60W 40/068 |
| 2022/0120632 | A1* | 4/2022 | Yang | G06T 7/521 |

* cited by examiner

IMAGE RENDERING METHOD AND RELATED APPARATUS

RELATED APPLICATIONS

This application is a continuation of International Application No. PCT/CN2022/117718, filed on Sep. 8, 2022, which claims priority to Chinese Patent Application No. 202111218899.0, entitled "IMAGE RENDERING METHOD AND RELATED APPARATUS," filed on Oct. 20, 2021. The disclosures of the prior applications are hereby incorporated by reference in their entirety.

FIELD OF THE TECHNOLOGY

This application relates to the field of maps, including an image rendering technology.

BACKGROUND OF THE DISCLOSURE

A particle road condition map is a visualization scheme of simulating vehicles by using dynamic particles, and reflecting a road traffic condition through the movement speed and direction, color, and density of particles. In practical application, the particle road condition map simulates the movement of vehicles on the road through the effect of particle flow, and to achieve this effect, it is generally needed to continuously redraw and render the picture of the particle road condition map at a certain frame rate, and update the locations of the particles in each frame of the picture.

In the related art, each time before redrawing and rendering the picture of the particle road condition map, it is needed to perform geometric computing on all particles in the particle road condition map in a traversal manner to determine the updated location data of all particles in a next frame of picture.

In the face of a large quantity of particles in the particle road condition map, the updated location data of all particles is calculated before each rendering of the picture of the particle road condition map, which brings great computational overhead to a central processing unit (CPU) and affects the rendering efficiency of the particle road condition map.

SUMMARY

Embodiments of this disclosure provide an image rendering method and a related apparatus, being capable of reducing the computational overhead of a CPU to a certain extent and improving the rendering efficiency of a particle road condition map.

In an embodiment, an image rendering method includes obtaining texture data corresponding to a particle road condition map in which particle movement simulates vehicle movement reflecting road traffic conditions. The texture data includes texel data corresponding to each road section in the particle road condition map, and the texel data includes location data of reference sampling points on a corresponding road section in the particle road condition map. The method further includes determining, during rendering of each frame of the particle road condition map, location data of each particle in the particle road condition map according to an animation running time corresponding to the respective frame and according to the location data of the reference sampling points, and rendering the respective frame corresponding to the animation running time in the particle road condition map according to the location data of each particle at the animation running time.

In an embodiment, an image rendering apparatus includes processing circuitry configured to obtain texture data corresponding to a particle road condition map in which particle movement simulates vehicle movement reflecting road traffic conditions. The texture data includes texel data corresponding to each road section in the particle road condition map, and the texel data includes location data of reference sampling points on a corresponding road section in the particle road condition map. The processing circuitry is further configured to determine, during rendering of each frame of the particle road condition map, location data of each particle in the particle road condition map according to an animation running time corresponding to the respective frame and according to the location data of the reference sampling points. The processing circuitry is further configured to render the respective frame corresponding to the animation running time in the particle road condition map according to the location data of each particle at the animation running time.

In an embodiment, a non-transitory computer-readable storage medium stores computer-readable instructions thereon, which, when executed by processing circuitry, cause the processing circuitry to perform an image rendering method includes obtaining texture data corresponding to a particle road condition map in which particle movement simulates vehicle movement reflecting road traffic conditions. The texture data includes texel data corresponding to each road section in the particle road condition map, and the texel data includes location data of reference sampling points on a corresponding road section in the particle road condition map. The method further includes determining, during rendering of each frame of the particle road condition map, location data of each particle in the particle road condition map according to an animation running time corresponding to the respective frame and according to the location data of the reference sampling points, and rendering the respective frame corresponding to the animation running time in the particle road condition map according to the location data of each particle at the animation running time.

According to the foregoing technical solutions, it can be learned that the embodiments of this disclosure have the following advantages:

The embodiments of this disclosure provide an image rendering method that innovatively uses a baked particle trail map to replace real-time location calculation during the rendering process of the particle road condition map. The baked particle trail map is essentially texture data corresponding to a pre-generated particle road condition map, the texture data includes texel data corresponding to each road section in the particle road condition map, and the texel data includes location data of reference sampling points sampled from a particle motion trail supported by a corresponding road section thereof. During rendering each frame of picture of the particle road condition map, location data of each particle in the particle road condition map at an animation running time corresponding to the picture can be directly determined based on the texel data in the texture data corresponding to the particle road condition map, and the picture in the particle road condition map is rendered based on the location data of each particle in the particle road condition map at the animation running time. Compared with a rendering method for a particle road condition map in the related art, in the embodiments of this disclosure, there is no need to calculate the location data of all particles in the particle road condition map in real time before rendering each frame of picture of the particle road condition map, and the current location data of each particle in the particle road condition map can be directly determined based on the location data carried in the texel data in the texture data corresponding to the particle road condition map, so as to greatly reduce the computational overhead required by the CPU during the rendering process of the particle road condition map.

DESCRIPTION OF EMBODIMENTS

Figure 1:
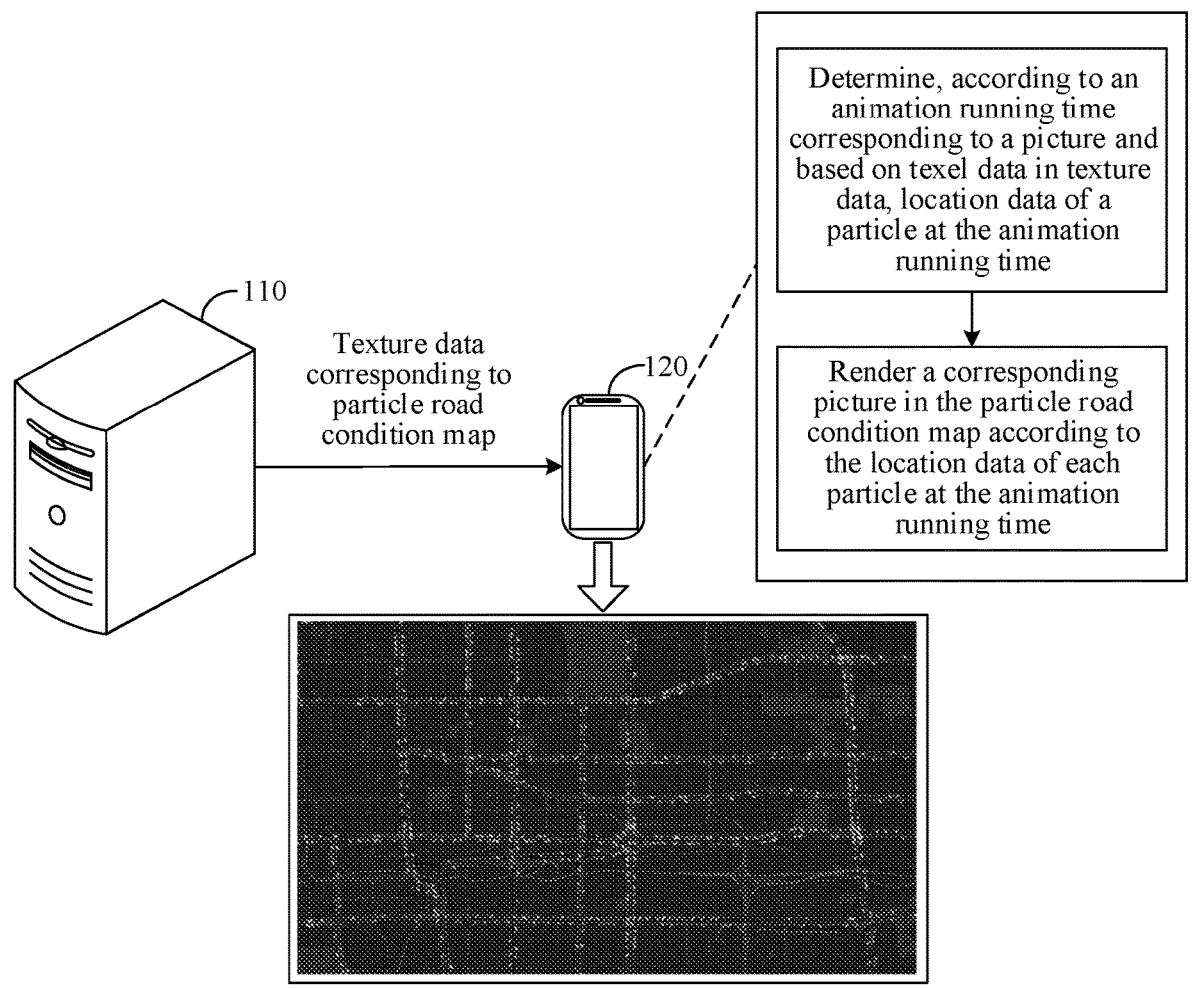
FIG. 1 is a schematic diagram of an application scenario of an image rendering method according to an embodiment of this disclosure.

In order to enable a person skilled in the art to better under the solutions of this disclosure, the technical solutions of the embodiments of this disclosure are described below with reference to the accompanying drawings in the embodiments of this application. The described embodiments are merely some rather than all of the embodiments of this disclosure. All other embodiments obtained by persons of ordinary skill in the art based on the embodiments of this disclosure fall within the scope of protection of this disclosure.

In this specification, claims, and accompanying drawings of this disclosure, the terms "first", "second", "third", "fourth", and so on (if it exists) are intended to distinguish similar objects but do not necessarily indicate a specific order or sequence. It is to be understood that such used data is interchangeable where appropriate so that the embodiments of this disclosure described here can be implemented in an order other than those illustrated or described here. Moreover, the terms "include", "have" and any other variants thereof aim at covering the non-exclusive inclusion, for example, a process, method, system, product, or device that includes a series of steps or units is not necessarily limited to those expressly listed steps or units, but may include other steps or units that are not expressly listed or inherent to such a process, method, system, product, or device.

An intelligent traffic system (ITS), also known as an intelligent transportation system, is to effectively and comprehensively apply advanced science and technologies (information technology, computer technology, data communication technology, sensor technology, electronic control technology, automatic control theory, operations research, artificial intelligence, etc.) to traffic transportation, service control and vehicle manufacturing, and strengthen a link among vehicles, roads, and users, thereby forming a comprehensive transportation system that guarantees safety, enhances efficiency, improves the environment and saves energy. The image rendering method provided in the embodiments of this disclosure may be used for rendering a particle road condition map related to the intelligent traffic system.

The image rendering method provided in the embodiments of this disclosure may be applied to any electronic device having an image rendering capability, such as a terminal device or a server. The terminal device may be specifically a smart phone, a tablet computer, a computer, a personal digital assistant (PDA), an intelligent speech interaction device, a smart home appliance, a vehicle-mounted terminal, and the like. The server may be specifically an application server or a web server, in actual deployment, may be an independent server, and may also be a cluster server or a cloud server.

To facilitate understanding of the image rendering method provided in the embodiments of this disclosure, an application scenario of the image rendering method is exemplarily described below by taking an execution subject of the image rendering method being a terminal device as an example.

FIG. 1 is a schematic diagram of an application scenario of an image rendering method according to an embodiment of this disclosure. As shown in FIG. 1, the application scenario includes a server 110 and a terminal device 120, and the server 110 and the terminal device 120 may communicate via a network. The server 110 may be a background server of a target application program for providing a location service, and the target application program supports displaying a particle road condition map. The target application program is run on the terminal device 120, and the terminal device 120 may execute the image rendering method according to an embodiment of this disclosure, and render and display the particle road condition map through the target application program.

In actual application, the server 110 may transmit texture data corresponding to the particle road condition map to the terminal device 120, the texture data including texel data corresponding to each road section in the particle road condition map, the texel data being used for carrying location data of reference sampling points on a corresponding road section thereof, and based on a reference frame rate, the reference sampling points being sampled on a particle motion trail supported by the road section.

Exemplarily, the terminal device 120 may transmit a particle road condition map display request to the server 110, and after receiving the particle road condition map display request, the server 110 may correspondingly generate the texture data corresponding to the particle road condition map requested by the terminal device 120. Specifically, the server 110 may determine a geographic area corresponding to the particle road condition map that the terminal device 120 requests to display, and obtain traffic information of the geographic area, for example, obtaining a traffic status (such as being smooth, slow, congested, and severely congested) of each road section in the geographic area. Then, the server 110 may perform, based on the traffic information of the geographic area and according to the reference frame rate (for example, a frame rate at which the terminal device 120 displays a picture of the particle road condition map), sampling on the particle motion trail supported by each road section in the geographic area, to obtain the reference sampling points on each road section, and determine the location data of the reference sampling points on each road section. Further, the server 110 may write the location data of the reference sampling points on each road section in the geographic area to the texture data to obtain the texture data corresponding to the particle road condition map, and transmit the texture data corresponding to the particle road condition map to the terminal device 120.

After obtaining the texture data corresponding to the particle road condition map, the terminal device 120 may render and display each frame of picture of the particle road condition map based on the texture data corresponding to the particle road condition map.

During rendering of each frame of picture of the particle road condition map, the terminal device 120 may first determine, for each particle in the particle road condition map according to an animation running time corresponding to the picture, the location data of the particle at the animation running time based on the texel data corresponding to the road section to which the particle belongs in the texture data corresponding to the particle road condition map. That is, the terminal device 120 may search the texture data corresponding to the particle road condition map for the texel data corresponding to the road section to which the particle belongs, and then derive the location data of the particle at the animation running time corresponding to the picture according to the location data carried in the found texel data. Based on this, the terminal device 120 may further render the picture in the particle road condition map according to the location data of each particle in the particle road condition map at the animation running time corresponding to the picture.

It is to be understood that the application scenario shown in FIG. 1 is merely an example. In actual application, the image rendering method provided in the embodiment of this disclosure can further be applied to other scenarios. For example, the image rendering method provided in the embodiment of this disclosure may also be independently executed by the server 110 or the terminal device 120. That is, a CPU in the server 110 or the terminal device 120 generates the texture data corresponding to the particle road condition map, and a graphics processing unit (GPU) in the server 110 or the terminal device 120 renders each frame of picture of the particle road condition map based on the texture data corresponding to the particle road condition map generated by the CPU. The image rendering method provided in the embodiment of this disclosure may be applied to various scenarios, including but being not limited to cloud technology, artificial intelligence, intelligent transportation, assisted driving, etc., and the application scenario of the image rendering method provided in the embodiment of this disclosure is not limited herein.

The image rendering method provided by this disclosure is described in detail below through a method embodiment.

Figure 2:
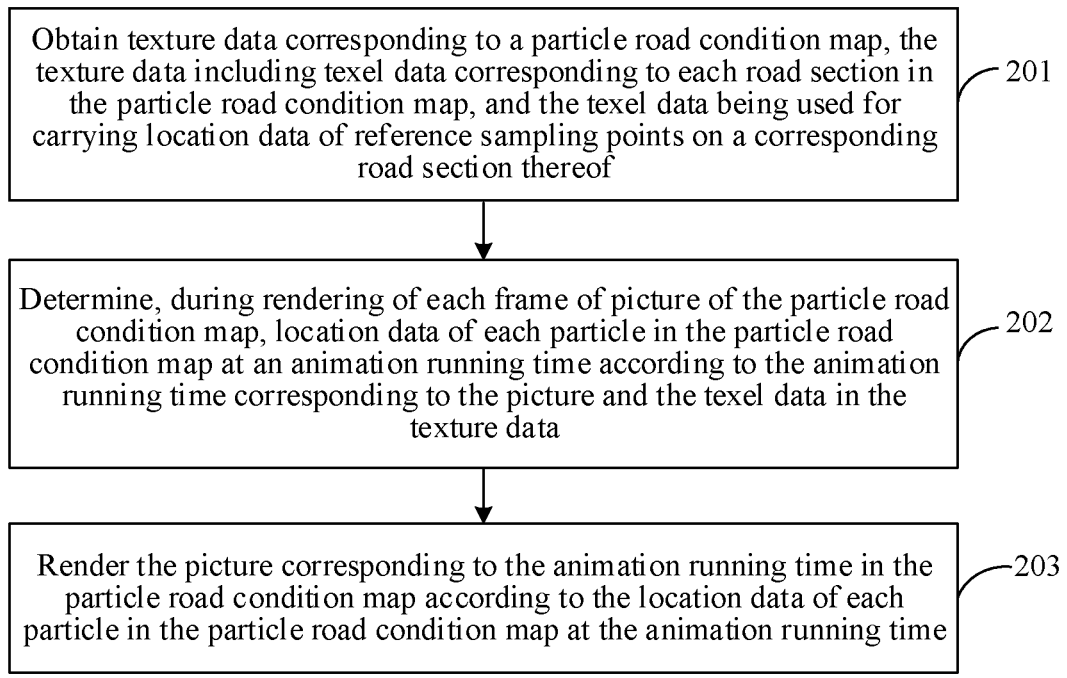
FIG. 2 is a schematic flowchart of an image rendering method according to an embodiment of this disclosure.

FIG. 2 is a schematic flowchart of an image rendering method according to an embodiment of this disclosure. To facilitate description, the following embodiment is still described by taking an execution subject of the image rendering method being a terminal device as an example. As shown in FIG. 2, the image rendering method includes the following steps:

Step 201. Obtain texture data corresponding to a particle road condition map, the texture data including texel data corresponding to each road section in the particle road condition map, and the texel data being used for carrying location data of reference sampling points on a corresponding road section thereof. For example, texture data corresponding to a particle road condition map in which particle movement simulates vehicle movement reflecting road traffic conditions is obtained. The texture data includes texel data corresponding to each road section in the particle road condition map, and the texel data includes location data of reference sampling points on a corresponding road section in the particle road condition map.

In the embodiment of this disclosure, before rendering and displaying the particle road condition map, the terminal device needs to first obtain the texture data corresponding to the particle road condition map. The texture data corresponding to the particle road condition map includes the texel data corresponding to each road section in the particle road condition map, the texel data is used for carrying the location data of the reference sampling points on the corresponding road section thereof, and based on a reference frame rate, the reference sampling points are sampled on a particle motion trail supported by the road section.

As an example, the terminal device may obtain the texture data corresponding to the particle road condition map from the server. For example, the terminal device may transmit a particle road condition map display request to the server, the particle road condition map display request may carry a geographic area corresponding to the particle road condition map requested to be displayed, and the server may accordingly generate, in response to the particle road condition map display request, the texture data corresponding to the particle road condition map according to a traffic condition in the geographic area, and then return the texture data corresponding to the particle road condition map to the terminal device.

As another example, the terminal device may also independently generate the texture data corresponding to the particle road condition map before rendering the particle road condition map. For example, the terminal device may obtain the traffic condition of a certain geographic area from the server, and then a CPU of the terminal device may generate, based on the traffic condition of the geographic area, the texture data corresponding to the particle road condition map used for reflecting the traffic condition of the geographic area, and then transmit the texture data corresponding to the particle road condition map to a GPU, so that the GPU obtains the location data of the particles from the texture data during rendering of the particle road condition map.

It is to be that in the related art, the CPU generally calculates updated location data of all particles before each rendering of a picture of the particle road condition map, and transmits the updated location data of all particles to the GPU, so that the GPU renders a next frame of picture of the particle road condition map based on the updated location data of all particles. In the process, a large amount of data needs to be transmitted, thereby causing a long transmission time and affecting the rendering efficiency of the particle road condition map. In the embodiment of this disclosure, the texture data corresponding to the particle road condition map is transmitted to the GPU before the particle road condition map is rendered, compared with the related art, a process of transmitting the location data of the particle from the CPU to the GPU during a particle road condition map rendering process is omitted, and thus, a data transmission time in the particle road condition map rendering process can be reduced, and the rendering efficiency of the particle road condition map is improved.

It is to be understood that the aforementioned implementation of obtaining the texture data corresponding to the particle road condition map is only an example. In actual application, the terminal device may also obtain the texture data corresponding to the particle road condition map in other manners. The manners for obtaining the texture data corresponding to the particle road condition map are not limited in this disclosure.

Figure 3:
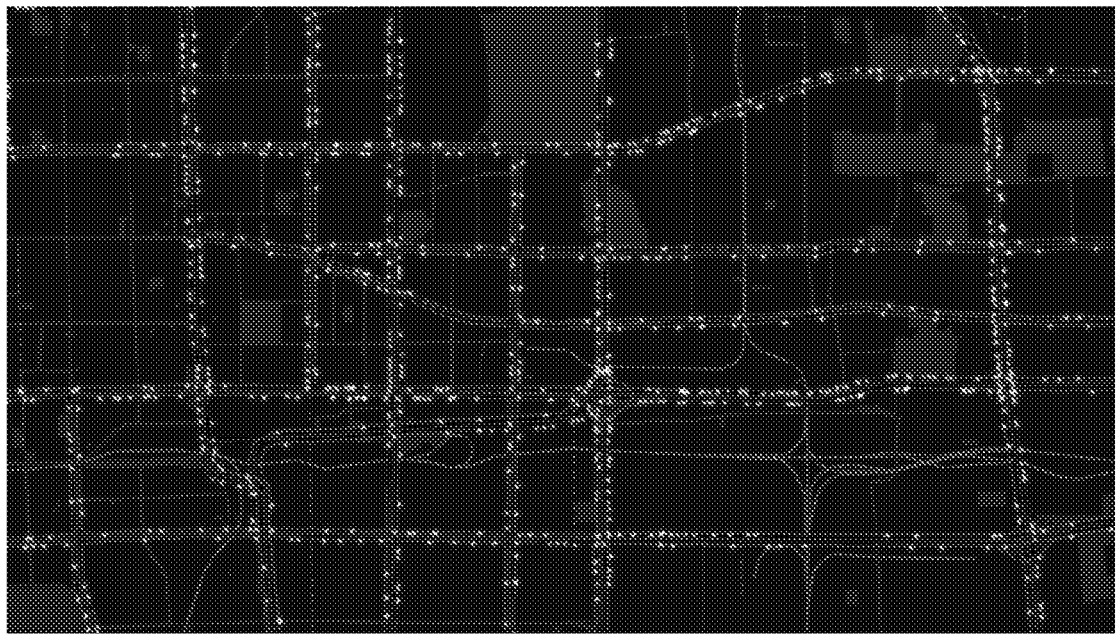
FIG. 3 is a schematic diagram of a picture of an exemplary particle road condition map according to an embodiment of this disclosure.

The particle road condition map is a dynamic image of simulating vehicles by using dynamic particles, and reflecting a road traffic condition through at least one piece of information of the movement speed and direction, color, and density of particles. The effect of particle flow in the particle road condition map is achieved by constantly redrawing the picture of the particle road condition map according to a certain frame rate, and updating the locations of the particles in each frame of picture. FIG. 3 is a schematic diagram of a picture of an exemplary particle road condition map. As shown in FIG. 3, the distribution conditions of particles on road sections having different traffic states are different; there are more particles that are more densely distributed on a congested road section, so as to simulate a condition that vehicles are dense due to congestion; and there are fewer particles that are more sparsely distributed on a smooth road section, so as to simulate a condition that the vehicles drive smoothly. In addition, a color of the particles in the particle road condition map may reflect the traffic state of the road section. For example, the particles on a congested road section are set to be red, the particles on a slow road section are set to be yellow, and the particles on a smooth road section are set to be green, etc.

Texture data is essentially a two-dimensional bitmap image, which is a commonly used data storage manner in image rendering, and each data bit stores a piece of texel data. The embodiment of this disclosure innovatively uses the texture data to store the location data of reference sampling points on a particle motion trail in the particle road condition map. Before the particle road condition map is rendered, the texture data of the particle road condition map is transmitted to a shader of a GPU, and accordingly, the GPU may directly read the location data of particles from the texture data when rendering the picture of the particle road condition map. In one aspect, a process of transmitting real-time location data of massive particles from a CPU to the GPU is eliminated, and the rendering efficiency is improved. In another aspect, the texture data is used for storing the location data of the reference sampling points on the particle motion trail, so that texture data can be shared, the amount of rendering batches is reduced, and the rendering performance is optimized.

In the embodiment of this disclosure, the texel data included in the texture data corresponding to the particle road condition map corresponds to the road section in the particle road condition map. That is, one road section in the particle road condition map may correspond to a plurality of pieces of texel data in the texture data, and these texel data is used for carrying the location data of a plurality of reference sampling points on the road section. The reference sampling points herein are obtained, based on a reference frame rate, by performing sampling on the particle motion trail supported by the road section, and the reference frame rate may be determined according to a frame rate commonly used when a terminal device displays the particle road condition map. For example, assuming that the frame rate commonly used when the terminal device displays the particle road condition map is 30 FPS to 50 FPS, 30 FPS may be determined as the reference frame rate, and the reference frame rate is not limited in this disclosure.

Figure 4:
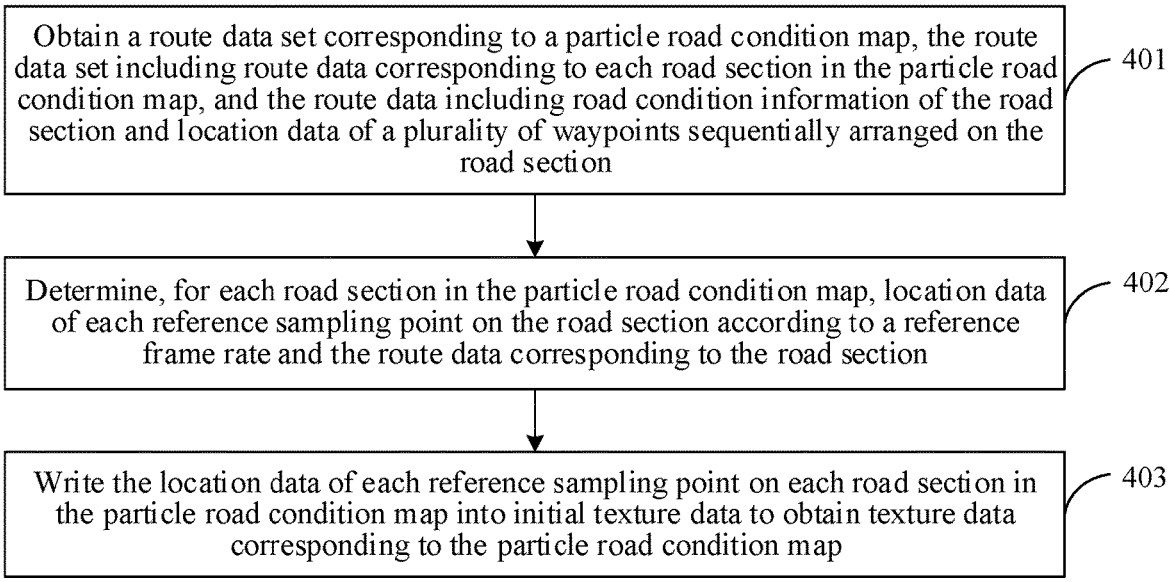
FIG. 4 is a schematic flowchart of generating texture data corresponding to a particle road condition map according to an embodiment of this disclosure.

The generation manner of the texture data corresponding to the aforementioned particle road condition map is described below in detail with reference to a process shown in FIG. 4. It is to be understood that an operation of generating the texture data corresponding to the particle road condition map may be executed by a server or by a terminal device. The execution subject of generating the texture data corresponding to the particle road condition map is not limited in this disclosure. As shown in FIG. 4, the generation manner of the texture data corresponding to the particle road condition map includes the following steps:

Step 401. Obtain a route data set corresponding to the particle road condition map, the route data set including route data corresponding to each road section in the particle road condition map, and the route data including road condition information of the road section and location data of a plurality of waypoints (coordinates) sequentially arranged on the road section.

Before generating the texture data of the particle road condition map, it is needed to first obtain a route data set linelist corresponding to the particle road condition map. The route data set linelist includes route data (line) corresponding to each road section in the particle road condition map. The route data (line) includes the road condition information t of the road section, and the location data (path) of a plurality of waypoints sequentially arranged on the road section. Exemplarily, the road condition information t included in the route data (line) may be used for reflecting the traffic state of the road section, such as being smooth, slow, and congested, and the location data (path) of the plurality of waypoints included in the route data (line) may be represented as $[p_0x, p_0y, p_1x, p_1y, \ldots, p_nx, p_ny]$, i.e., x coordinates and y coordinates of the plurality of waypoints $p_0, p_1, \ldots,$ and $p_n$ are sequentially arranged.

Step 402. Determine, for each road section in the particle road condition map, the location data of each reference sampling point on the road section according to a reference frame rate and the route data corresponding to the road section.

After obtaining the route data set corresponding to the particle road condition map, for each road section in the particle road condition map, a particle motion trail supported by the road section may be determined based on the location data of the waypoints included in the route data corresponding to the road section; and the particle motion trail is sampled according to the reference frame rate to obtain each reference sampling point on the road section, and the location data of each reference sampling point on the road section is correspondingly determined.

In one possible implementation, each sub road section on the road section and a length of the sub road section may be determined according to the location data of a set of two adjacent waypoints (coordinates) in the route data, and start and end points of the sub road section respectively are two adjacent waypoints. Then, for each sub road section on the road section, a quantity of the reference sampling points on the sub road section is determined according to the length of the sub road section, the reference frame rate, and a particle motion velocity corresponding to the road section, and the particle motion velocity is determined according to the road condition information in the route data corresponding to the road section. Further, for each sub road section on the road section, the location data of each reference sampling point on the sub road section is determined according to the location data of the start and end points of the sub road section and the quantity of the reference sampling points on the sub road section.

Exemplarily, assuming that the route data corresponding to a certain road section includes the location data of n (n is an integer greater than 1) waypoints, the n waypoints are $p_1$, $p_2$, ..., and $p_n$, and the n waypoints are sequentially arranged on the road section, then every two adjacent waypoints of the n waypoints may be used for forming a sub road section. For example, $p_1$ and $p_2$ are used for forming one sub road section, $p_2$ and $p_3$ are used for forming one sub road section, ..., and $p_{n-1}$ and $p_n$ are used for forming one sub road section, and thus, n−1 sub road sections are obtained.

Then, the length of each sub road section may be calculated. For example, for an $i^{th}$ sub road section, the $length_i$ thereof may be calculated through equation (1):

$$length_i = \sqrt{(p_{i+1}x - p_ix)^2 + (p_{i+1}y - p_iy)^2} \quad (1)$$

Further, for each sub road section, the quantity of the reference sampling points on the sub road section may be determined according to the length of the sub road section, the reference frame rate, and the particle motion velocity corresponding to the road section. For example, for the $i^{th}$ sub road section, the quantity Ni of the reference sampling points thereon may be calculated through equation (2):

$$N_i = \frac{length_i}{\Delta D} = \frac{length_i * F}{v} \quad (2)$$

ΔD=v/F is used for representing a distance between two adjacent reference sampling points on the $i^{th}$ sub road section. It is to be understood that ΔD is generally different on road sections having different road condition information, the smoother the road section is, the larger ΔD is, and the more congested the road section is, the smaller ΔD is. F is the reference frame rate and may be set depending on an actual condition. For example, the reference frame rate may be set to be a basic frame rate, i.e., 30 FPS, of a smooth animation. The reference frame rate is essentially a frequency at which the reference sampling points are collected on the particle motion trail, for example, when the reference frame rate is 30 FPS, collection is performed 30 times per second on the particle motion trail. v is the particle motion velocity corresponding to the road section, and may be determined according to the road condition information in the route data corresponding to the road section. The particle motion velocity is negatively correlated with a congestion degree reflected by the road condition information, i.e., the more congested the road section reflected by the road condition information is, the slower the particle motion velocity corresponding to the road section is, and the smoother the road section reflected by the road condition information is, the faster the particle motion velocity corresponding to the road section is. In an embodiment of this disclosure, a correspondence between the particle motion velocity and the road condition information may be set in advance, and then during determining of the quantity of the reference sampling points on the sub road section, the particle motion velocity corresponding to the road section may be directly determined according to the correspondence. For example, the road condition information for reflecting a smooth road section may be set to correspond to the particle motion velocity of 80 pixels per second, and the road condition information for reflecting a congested road section may be set to correspond to the particle motion velocity of 10 pixels per second, etc. The correspondence between the particle motion velocity and the road condition information is not specifically limited in this disclosure.

Further, for each sub road section on the road section, a corresponding quantity of reference sampling points (i.e., the quantity determined through the aforementioned equation (2)) may be interpolated between the start and end points of the sub road section. For example, assuming that the quantity of the reference sampling points on the $i^{th}$ sub road section is $N_i$, the reference sampling point $p_{ij}$ may be interpolated on the $i^{th}$ sub road section based on the location data of the start and end points of the $i^{th}$ sub road section through equation (3) and equation (4), where a value of j is 0 to $N_{i-1}$:

$$p_{ij}x = p_ix * \frac{N-j}{N} + p_{i+1}x * \frac{j}{N} \quad (3)$$

$$p_{ij}y = p_iy * \frac{N-j}{N} + p_{i+1}y * \frac{j}{N} \quad (4)$$

$p_ix$ and $p_iy$ are the abscissa and ordinate of the start point of the $i^{th}$ sub road section, and $p_{i+1}x$ and $p_{i+1}y$ are the abscissa and ordinate of the end point of the $i^{th}$ sub road section.

The reference sampling points in all sub road sections on the road section are sequentially arranged to obtain the particle motion trail supported by the road section. For example, the particle motion trail supported by a certain road section may be represented as $[p_{00}, p_{01}, p_{02}, \ldots, p_{ij} \ldots]$.

Step 403. Write the location data of each reference sampling point on each road section in the particle road condition map into initial texture data to obtain the texture data corresponding to the particle road condition map.

After obtaining the location data of each reference sampling point on each road section in the particle road condition map through the aforementioned step, the location data of each reference sampling point may be written into the initial texture data to obtain the texture data corresponding to the particle road condition map.

In one possible implementation, the initial texture data may be created first, a quantity of texels carried in the initial texture data being greater than or equal to a total quantity of the reference sampling points in the particle road condition map. Then, the location data of each reference sampling point on each road section in the particle road condition map is converted to a reference channel value of the texels in the initial texture data to obtain a reference channel value corresponding to each reference sampling point. Further, the reference channel value corresponding to each reference sampling point is sequentially written into a reference location data sequence, and the texture data corresponding to the particle road condition map is generated according to the reference location data sequence.

Exemplarily, the initial texture data may be created first, and a binary sequence matched with a size of the initial texture data is created as the reference location data sequence. For example, assuming that the created initial texture data has a width of w and a height of h, then a quantity of texels that the initial texture data can carry is size=w*h. Because each texel is generally expressed by four 8-bit unsigned integer numbers, i.e., RGBA (red, green, blue, alpha), the reference location data sequence in the following form that matches the initial texture data may be accordingly created:

pointArray=new Uint8ClampedArray(*w*\**h*\*4)

When generating the texture data corresponding to the particle road condition map, each road section in the particle road condition map may be traversed, and the location data of each reference sampling point on each road section in the particle road condition map is converted to an RGBA channel value of the texel in the initial texture data to obtain an RGBA channel value corresponding to each reference sampling point. Then, the RGBA channel value corresponding to each reference sampling point is sequentially written into the previously created reference location data sequence. Further, the RGBA channel value corresponding to each reference sampling point in the reference location data sequence is accordingly written into the texel data in the initial texture data to obtain the texture data corresponding to the particle road condition map.

In actual application, when a size of the particle road condition map is large, for example, when the range of a geographic area corresponding to the particle road condition map is large, during rendering of the particle road condition map, the terminal device needs to perform rendering by using a target size as a unit. That is, the terminal device needs to divide the particle road condition map by using the target size as the unit, so as to obtain a plurality of sub road condition maps, and then renders each sub road condition map one by one. Exemplarily, the terminal device may load data in the particle road condition map by using a tile as a unit, and render the particle road condition map by using the tile as the unit.

In this case, during creation of the initial texture data, the initial texture data corresponding to each sub road condition map may be created, where the sub road condition map is obtained by dividing the particle road condition map based on the target size described above. Then, for each sub road condition map, the location data of each reference sampling point on each road section in the sub road condition map may be converted to the reference channel value of the texels in the initial texture data corresponding to the sub road condition map to obtain the reference channel value corresponding to each reference sampling point in the sub road condition map. The location data of each reference sampling point in the sub road condition map herein is essentially determined in a coordinate space corresponding to the sub road condition map. Further, for each sub road condition map, the reference channel value corresponding to each reference sampling point is sequentially written into the reference location data sequence corresponding to the sub road condition map, and the texture data corresponding to the sub road condition map is generated according to the reference location data sequence corresponding to the sub road condition map.

Exemplarily, in each sub road condition map obtained by dividing the particle road condition map in the unit of the tile, an abscissa x and an ordinate y of the reference sampling point may both have a value range of [−128, 383]. In this case, if each texel in the initial texture data corresponding to the sub road condition map is expressed by four 8-bit unsigned integer numbers of RGBA, any two channel values in the texel may be used for carrying the abscissa of the reference sampling point, and the remaining two channel values may be used for carrying the ordinate of the reference sampling point, so that the conversion of the location data of the reference sampling point to the reference channel value corresponding to the reference sampling point is realized. Further, the reference channel value corresponding to the converted reference sampling point is written into the reference location data sequence corresponding to the sub road condition map. It is to be understood that the reference location data sequence is constructed based on the initial texture data corresponding to the sub road condition map, and matches the size of the initial texture data corresponding to the sub road condition map. According to the reference channel value corresponding to each reference sampling point in the reference location data sequence corresponding to the sub road condition map, the texel data of each texel in the initial texture data corresponding to the sub road condition map is accordingly determined, so as to obtain the texture data corresponding to the sub road condition map. It is to be understood that the manner of determining the texture data corresponding to the sub road condition map is the same as the manner of determining the texture data corresponding to the particle road condition map described above, and is not described herein again.

In one possible implementation, the conversion of the location data of each reference sampling point in the particle road condition map to the reference channel value of the texel in the initial texture data may be achieved in the following manner: determining, for the location data of each reference sampling point, a red channel value and a green channel value of each texel according to horizontal location data in the location data, and determining a blue channel value and an alpha channel value of the texel according to longitudinal location data in the location data; or determining, for the location data of each reference sampling point, the red channel value and the green channel value of the texel according to the longitudinal location data in the location data, and determining the blue channel value and the alpha channel value of the texel according to the horizontal location data in the location data.

Exemplarily, assuming that the particle road condition map is divided in the unit of the tile to obtain the plurality of sub road condition maps, and the abscissa x and ordinate y of each reference sampling point in each sub road condition map have the value range of [−128, 383], in a case that each texel in the initial texture data corresponding to the sub road condition map is expressed by the four 8-bit unsigned integer numbers of RGBA, the location data of the reference sampling point may be converted to the RGBA channel value corresponding to the reference sampling point in the following manner:

$x'=x+128, y'=y+128$ $r=x'>256? (x'-256): 0$ $g=x'>256? 256: x'$ $b=y'>256? (y'-256): 0$ $a=y'>256? 256: y'$

That is, considering that the value range of x and y is [−128, 383], and a range of a 8-bit unsigned integer number is [0, 256], 128 may be first added to the original values of x and y to obtained x' and y'. Then, it is determined whether x' is greater than 256, if yes, an R channel value of the texel is determined to be (x'−256), and if not, the R channel value of the texel is determined to be 0 is determined. It is determined whether x' is greater than 256, if yes, a G channel value of the texel is determined to be 256, and if not, the G channel value of the texel is determined to be x'. It is determined whether y' is greater than 256, if yes, a B channel value of the texel is determined to be (y'−256), and if not, the B channel value of the texel is determined to be 0. It is determined whether y' is greater than 256, if yes, an A channel value of the texel is determined to 256, and if not, the A channel value of the texel is determined to be y'. Therefore, the R channel value and the G channel value of the texel are used for carrying the abscissa of the reference sampling point, and the B channel value and the A channel value of the texel are used for carrying the ordinate of the reference sampling point.

Alternatively, in a similar manner as above, the R channel value and the G channel value of the texel are used for carrying the ordinate of the reference sampling point, and the B channel value and the A channel value of the texel are used for carrying the abscissa of the reference sampling point.

Certainly, in actual application, the RGBA channel values of the texel may also be used in other manners for carrying the location data of the reference sampling points. For example, the R channel value and the B channel value of the texel are used for carrying the abscissa of the reference sampling point, and the G channel value and the A channel value of the texel are used for carrying the ordinate of the reference sampling point, etc. Alternatively, the conversion of the location data to the RGBA channel values of the texel may also be realized through other algorithms. The implementation of converting the location data of the reference sampling point to the RGBA channel values of the texel is not limited in this disclosure.

To facilitate quick obtaining of the texel data corresponding to the road section in the texture data corresponding to the particle road condition map in a process of rendering the particle road condition map, in the embodiment of this disclosure, start point offset corresponding to each road section in the particle road condition map can also be recorded in a process of generating the texture data corresponding to the particle road condition map. That is, for each road section in the particle road condition map, the start point offset corresponding to the road section in the reference location data sequence is determined, and a correspondence between the road section and the start point offset is recorded; and the start point offset corresponding to the road section is a location of the reference channel value corresponding to a first reference sampling point on the road section in the reference location data sequence.

Figure 5:
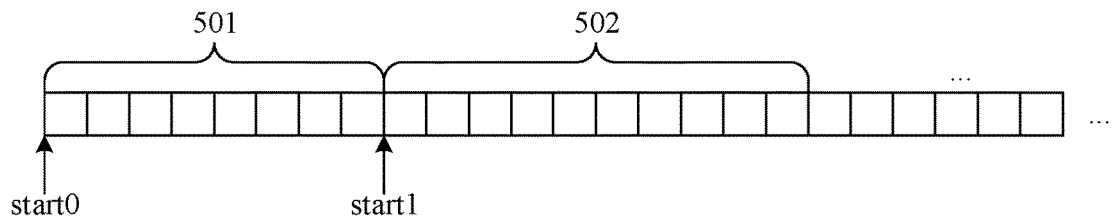
FIG. 5 is a schematic diagram of an implementation of recording start point offset corresponding to a road section according to an embodiment of this disclosure.

FIG. 5 is a schematic diagram of an implementation of recording start point offset corresponding to a road section. As shown in FIG. 5, a reference location data sequence includes a reference channel value corresponding to each reference sampling point on each road section. For example, a part 501 of the reference location data sequence is used for carrying the reference channel value corresponding to each reference sampling point on a road section line0, a part 502 of the reference location data sequence is used for carrying the reference channel value corresponding to each reference sampling point on a road section line1, and so on. When determining, for each road section in a particle road condition map, the start point offset corresponding to each road section, a location of the reference channel value corresponding to a first reference sampling point in the reference location data sequence is recorded as the start point offset corresponding to the road section during writing of the reference channel value corresponding to the first reference sampling point on the road section into the reference location data sequence. As shown in FIG. 5, start0 is the start point offset corresponding to the road section line0, and start1 is the start point offset corresponding to the road section line1.

An implementation code for the start point offset corresponding to the road section is recorded in the aforementioned manner, and an example is as follows:

```
let start = 0;
let trailInfo = [ ];
trailList.forEach(trail=>{
  trail.forEach(p=>{
    //write data into pointArray
    ...
  })
  trailInfo.push({start;start});
  start+ = trail.length;
});
```

It is to be understood that the implementation of determining the start point offset corresponding to the road section described above is only an example, and in actual application, the start point offset corresponding to the road section may also be directly determined in the texture data corresponding to the particle road condition map. For example, for each road section in the particle road condition map, indexes (which may include a row index and a column index) of a texel, in the texture data, used for carrying the reference channel value corresponding to the first reference sampling point on the road section are used as the start point offset corresponding to the road section. The implementation of determining the start point offset corresponding to the road section is not limited in this disclosure.

Step 202. Determine, during rendering of each frame of picture of the particle road condition map, location data of each particle in the particle road condition map at an animation running time according to the animation running time corresponding to the picture and the texel data in the texture data. For example, during rendering of each frame of the particle road condition map, location data of each particle in the particle road condition map is determined according to an animation running time corresponding to the respective frame and according to the location data of the reference sampling points.

After obtaining the texture data corresponding to the particle road condition map, a terminal device may render each frame of picture of the particle road condition map based on the texture data corresponding to the particle road condition map by using a GPU of the terminal device. During rendering of each frame of picture of the particle road condition map, for each particle in the particle road condition map, the GPU may determine the location data of the particle at the animation running time according to the animation running time corresponding to the currently rendered picture and the texel data corresponding to the road section to which the particle belongs in the texture data.

The animation running time corresponding to the picture is a time difference between a playback time of the picture and an initial playback time of the particle road condition map (i.e., a time when a first frame of picture of the particle road condition map is played back), and the animation running time may decide a motion location of the particle in the particle road condition map.

In one possible implementation, the terminal device may determine the location data of the particle in the particle road condition map at the animation running time in the following manner: determining an offset of the particle at the animation running time according to the animation running time and an initial offset of the particle on the road section to which the particle belongs; then, determining indexes of a target texel according to the offset of the particle at the animation running time, a frame rate of the particle road condition map, the road condition information of the road section to which the particle belongs, and the start point offset corresponding to the road section to which the particle belongs, the start point offset corresponding to the road section being used for indicating a distribution location of the location data of the reference sampling point belonging to the road section in the texture data; and further, searching the texture data for target texel data according to the indexes of the target texel, and determining the location data of the particle at the animation running time according to the target texel data.

Exemplarily, in order to achieve the effect of particle flow in the particle road condition map, it is needed to update a location of each particle in each frame of picture of the particle road condition map, and thus, in the embodiment of this disclosure, before rendering each frame of picture of the particle road condition map, an animation running time is transmitted to the GPU, where the animation running time is an animation running time corresponding to the picture that currently needs to be rendered, that is, a time difference between a rendering time of the picture that currently needs to be rendered and a rendering time of a first frame of picture of the particle road condition map. Further, the GPU may calculate, for each particle in the particle road condition map, the offset offsetNow of the particle at the animation running time through equation (5) below:

$$\text{offsetNow} = \text{offset} + v*t \qquad (5)$$

offset is the initial offset of the particle on the road section to which the particle belongs, and is pre-configured for each particle in the particle road condition map. v is a particle motion velocity corresponding to the road section to which the particle belongs, and the particle motion velocity is determined according to the road condition information of the road section to which the particle belongs. For example, a correspondence between the particle motion velocity and the road condition information may be pre-configured, and accordingly, during calculation of the offset of each particle at a certain animation running time, the particle motion velocity corresponding to the road section to which the particle belongs may be directly determined based on the correspondence and the road condition information of the road section to which the particle belongs. t is the animation running time corresponding to the picture that currently needs to be rendered. It is to be understood that a unit of the aforementioned v is pixels per second, and the unit of the aforementioned offsetNow and the offset are both pixels.

Further, the terminal device may search the texture data corresponding to the particle road condition map for the target texel according to the calculated offset of the particle at the animation running time, the current frame rate of the particle road condition map, the particle motion velocity corresponding to the road section to which the particle belongs, and the start point offset corresponding to the road section to which the particle belongs, and the location data carried by the target texel has high reference value for determining the location data of the particle at the animation running time. That is, the location data carried by the target texel is identical or similar to the location data of the particle at the animation running time.

As an example, the terminal device may determine the indexes of the target texel in the following manner: performing remainder operation on a length of the road section to which the particle belongs by using the offset of the particle at the animation running time, to determine a target offset; then determining an offset index of the particle according to the target offset, the current frame rate of the particle road condition map, and the particle motion velocity corresponding to the road section to which the particle belongs, the particle motion velocity corresponding to the road section being determined according to the road condition information of the road section; further, determining a horizontal index and a longitudinal index of a reference texel according to the offset index of the particle and the start point offset corresponding to the road section to which the particle belongs; and respectively performing sub-pixel offset processing on the horizontal index and the longitudinal index of the reference texel to obtain a horizontal index and a longitudinal index of the target texel.

Specifically, in the particle road condition map, motion executed by the particle on the road section is essentially cyclic motion. That is, after each particle on the road section moves from an initial offset location of the particle on the road section to an end point of the road section, the particle needs to return to a start point of the road section and move on the road section along a particle motion direction corresponding to the road section again. To achieve the cyclic motion of the particle on the road section, in the embodiment of this disclosure, it is needed to use the following equation (6) and use the offset of the particle at the animation running time to perform reminder operation on the length of the road section to which the particle belongs so as to determine an actual offset, i.e., the target offset offsetNow', of the particle on the road section to which the particle belongs:

$$\text{offsetNow}' = \text{offsetNow} \ \% \ \text{length} \qquad (6)$$

offsetNow is an offset of the particle at the animation running time that is determined through the aforementioned equation (5) based on the initial offset of the particle on the road section to which the particle belongs, the particle motion velocity corresponding to the road section to which the particle belongs, and the animation running time corresponding to the picture that needs to be rendered. length is the length of the road section to which the particle belongs. When the offset offsetNow of the particle at a certain animation running time is less than the length of the road section to which the particle belongs, the target offset offsetNow' of the particle on the road section is offsetNow; and when the offset offsetNow of the particle at the certain animation running time is greater than or equal to the length of the road section to which the particle belongs, the target offset offsetNow' of the particle on the road section is a remainder of dividing offsetNow by length.

The terminal device may divide the current sampling interval distance of the road section to which the particle belongs by the target offset of the particle on the road section to which the particle belongs, so as to obtain the offset index of the particle. The current sampling interval distance of the road section is determined based on the current frame rate of the particle road condition map and the particle motion velocity corresponding to the road section to which the particle belongs, and is used for representing a motion distance of the same particle on the road section in two adjacent sampling operations. The offset index of the particle herein represents the indexes of the reference texel in the texel corresponding to the road section to which the particle belongs, and the location data carried by the reference texel has high reference value for determining the location data at the target offset on the road section. Specifically, the terminal device may calculate the offset index (step) of the particle through the following equation (7):

$$\text{step} = \frac{\text{offsetNow}'}{\Delta D} = \frac{\text{offsetNow}' * F}{v} \qquad (7)$$

offsetNow' is the target offset of the particle on the road section to which the particle belongs. $\Delta D$ is the current sampling interval distance of the road section to which the particle belongs, $\Delta D = v/F$, where F is the current frame rate of the particle road condition map, and v is the particle motion velocity corresponding to the road section to which the particle belongs.

Figure 6:
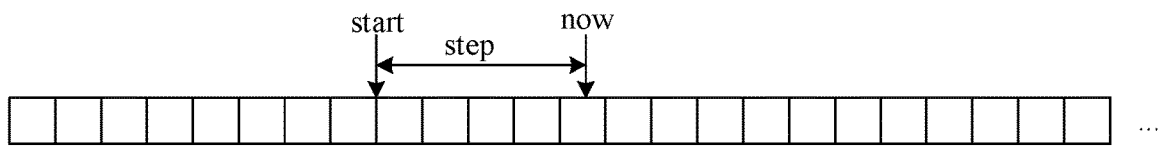
FIG. 6 is a schematic diagram of an implementation principle of calculating indexes of a reference texel according to an embodiment of this disclosure.

After calculating the offset index (step) of the particle, the terminal device may determine a horizontal index and a longitudinal index of the reference texel according to the offset index of the particle and the start point offset corresponding to the road section to which the particle belongs. By taking that the start point offset corresponding to the road section to which the particle belongs is the location of the reference channel value corresponding to the first reference sampling point on the road section in the reference location data sequence as an example, FIG. 6 is a schematic diagram of an implementation principle of calculating a reference texel index in this case. As shown in FIG. 6, after the terminal device calculates the offset index (step) of the particle, the step may be added to the start point offset (start) corresponding to the road section to which the particle belongs, the reference channel value carried at a (start+ step) location in the reference location data sequence is the reference channel value of the reference texel, and the location data on which the conversion of the reference channel value is based has high reference value for determining the location data at the target offset on the road section, that is, the location data on which the conversion of the reference channel value is based may be identical or similar to the location data at the target offset on the road section. On this basis, the terminal device may further calculate the horizontal index (i.e., a column index (column)) and longitudinal index (i.e., a row index (row)) of the reference texel through equation (8) and equation (9):

$$\text{column} = (\text{start} + \text{step})\% \ w \qquad (8)$$

$$\text{row} = \text{floor}\left(\frac{\text{start} + \text{step}}{w}\right) \qquad (9)$$

w represents a width of texture data corresponding to a particle road condition map; the horizontal index of the reference texel is obtained by using (start+step) to perform remainder operation on the width w of the texture data; floor( ) is a floor function; and the longitudinal index of the reference texel is obtained by rounding down a result of division of (start+step) by w.

Considering that in many cases, there may be a deviation in the reference texel determined through the aforementioned manner, for example, the horizontal index and longitudinal index of the determined reference texel both are small, and accordingly, calculating the location data of the particle at the animation running time directly based on the location data carried by the reference texel may cause the calculated location data to be inaccurate. To avoid the condition, in the embodiment of this disclosure, after calculating the horizontal index and longitudinal index of the reference texel, sub-pixel offset processing may further be separately performed on the horizontal index and longitudinal index of the reference texel to obtain the horizontal index and longitudinal index of the target texel, where the location data carried by the target texel is generally closer to the location data at the target offset on the road section than the location data carried by the reference texel, that is, the location data carried by the target texel has more reference value than the location data carried by the reference texel. Exemplarily, the terminal device may separately perform sub-pixel offset processing on the horizontal index and longitudinal index of the reference texel through equation (10) and equation (11) to obtain the horizontal index u and longitudinal index v of the target texel:

$$u = \frac{\text{column} + 0.5}{w} \qquad (10)$$

$$v = \frac{\text{row} + 0.5}{h} \qquad (11)$$

Figure 7:
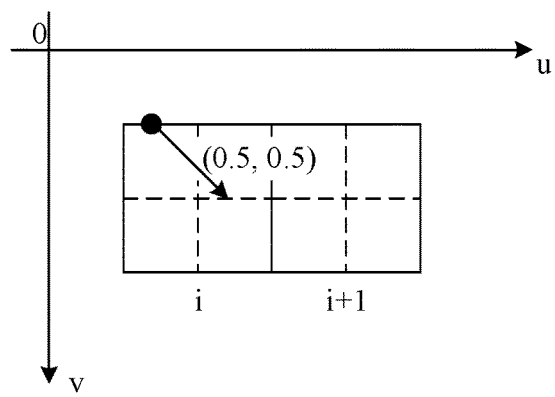
FIG. 7 is a schematic diagram of an implementation principle of sub-pixel offset processing according to an embodiment of this disclosure.

FIG. 7 is a schematic diagram of an implementation principle of the aforementioned sub-pixel offset processing. As shown in FIG. 7, the sub-pixel offset processing is realized through the aforementioned equations (10) and (11), and essentially relates to respectively offsetting by 0.5 in a horizontal direction and a longitudinal direction, and then performing normalization processing to obtain the abscissa and ordinate of a target texel.

It is to be understood that an implementation process of determining the indexes of the target texel is described above by taking that a start point offset corresponding to a road section is a location of a reference channel value corresponding to a first reference sampling point on the road section in a reference location data sequence as an example. When the start point offset corresponding to the road section is in other representation forms, in an embodiment of this disclosure, the indexes of the target texel may also be determined in a corresponding manner on the basis of the start point offset. The implementation of determining the indexes of the target texel is not limited herein in this disclosure.

After determining the indexes of the target texel, the terminal device may search texture data for corresponding target texel data according to the indexes of the target texel, and further determine the location data of a particle at an animation running time according to the target texel data.

As an example, considering that a reference frame rate on which generation of the texture data is based may not be completely consistent with a frame rate at which a particle road condition map is actually displayed, this results in that the location data of the particles does not have one-to-one correspondence to the location data carried by texels when texture mapping is carried out in a shader, and the location data of each particle may be in a middle location of the location data carried by two texels. For this case, in the embodiment of this disclosure, texture bilinear interpolation processing supported by the shader is used for performing interpolation processing on texel data, so as to obtain the location data accurately corresponding to a location of the particle, thereby ensuring smooth motion of the particle. That is, the terminal device may perform texture bilinear interpolation processing according to the target texel data to obtain interpolation texel data, and further perform conversion according to the interpolation texel data to obtain the location data of the particle at the animation running time.

Bilinear interpolation is a texture mapping technology used for producing realistic images, and may also be generally referred to as "bilinear filtering" or "bilinear texture mapping". The algorithm is used for mapping a location of a screen pixel to a corresponding point on a texture map, calculating RGBA channel values of adjacent four texels through weighted average, and then applying the calculated RGBA channel values to the screen pixel. In the embodiment of this disclosure, after the terminal device determines the target texel, a bilinear interpolation algorithm may be used for calculating the RGBA channel values of an interpolation texel based on the RGBA channel values of texels adjacent to the target texel at upper, lower, left, and right sides. Further, the RGBA channel values of the interpolation texel are converted to obtain the location data of the particle at the animation running time. For example, assuming that during generation of the texel data, the R channels and G channels of the texels are used for carrying the horizontal location data of the particle, and the B channels and A channels of the texels are used for carrying the longitudinal location data of the particle, then the horizontal location data of the particle may be determined based on the R channel value and G channel value of the interpolation texel, and the longitudinal location data of the particle may be determined based on the B channel value and A channel value of the interpolation texel.

Certainly, in actual application, the terminal device may not perform the texture bilinear interpolation processing, but directly convert the target texel data to obtain the location data of the particle at the animation running time. The implementation of converting the location data of the particle based on the texel data is not limited in this disclosure.

Step 203. Render a picture corresponding to the animation running time in the particle road condition map according to the location data of each particle in the particle road condition map at the animation running time. For example, the respective frame is rendered corresponding to the animation running time in the particle road condition map according to the location data of each particle at the animation running time.

After determining the location data of each particle in the particle road condition map at the animation running time corresponding to the picture that needs to be rendered, the terminal device may further render the picture in the particle road condition map according to the location data of each particle at the animation running time.

Because there are generally a large amount of particles having a similar structure in the particle road condition map, to improve the rendering efficiency of the particle road condition map, in the embodiment of this disclosure, an instanced rendering manner may be used for rendering each particle in the particle road condition map. That is, the terminal device may obtain a target particle structure, and the target particle structure is a basic structure shared by each particle in the particle road condition map. Then, for each particle in the particle road condition map, the particle in the picture of the particle road condition map is rendered according to the target particle structure and instance data corresponding to the particle, where the instance data corresponding to the particle includes the location data of the particle at the animation running time determined in step 202.

Instanced rendering is a technique of abstracting, when dealing with a large amount of similar objects, a common geometric structure of the objects, and calling a rendering instruction once to draw all objects. In the embodiment of this disclosure, during rendering of the particle in the particle road condition map, a quadrilateral may be used as a basic mesh surface (i.e., the target particle structure), supplemented by a two-dimensional map, to achieve the construction of a particle shape. Specifically, in the embodiment of this disclosure, during rendering of each frame of picture of the particle road condition map, the terminal device may first obtain the basic structure, i.e., the target particle structure, shared by all particles in the particle road condition map, and then, for each particle in the particle road condition map, renders and draws the particle according to the instance data of the particle and the target particle structure, where the instance data of the particle at least includes the location data of the particle determined in step 202, and may further include the color of the particle, and the like.

The embodiment of this disclosure provides an image rendering method that innovatively uses a baked particle trail map to replace real-time location calculation during the rendering process of the particle road condition map, and the baked particle trail map is essentially the texture data corresponding to the particle road condition map. On this basis, in the embodiment of this disclosure, when rendering each frame of picture of the particle road condition map, there is no need to calculate the location data of all particles in the particle road condition map in real time, and the current location data of each particle in the particle road condition map can be directly determined based on the location data carried in the texel data in the texture data corresponding to the particle road condition map, so as to greatly reduce the computational overhead required by a CPU during the rendering process of the particle road condition map.

To facilitate further understanding of the image rendering method provided in the embodiments of this disclosure, an overall implementation process of the image rendering method is exemplarily described below with reference to FIG. 8. The implementation of the image rendering method provided in an embodiment of this disclosure is mainly divided into two parts: particle trail map baking and particle instanced rendering. The method can be implemented based on an open graphics library (OpenGL).

Figure 8:
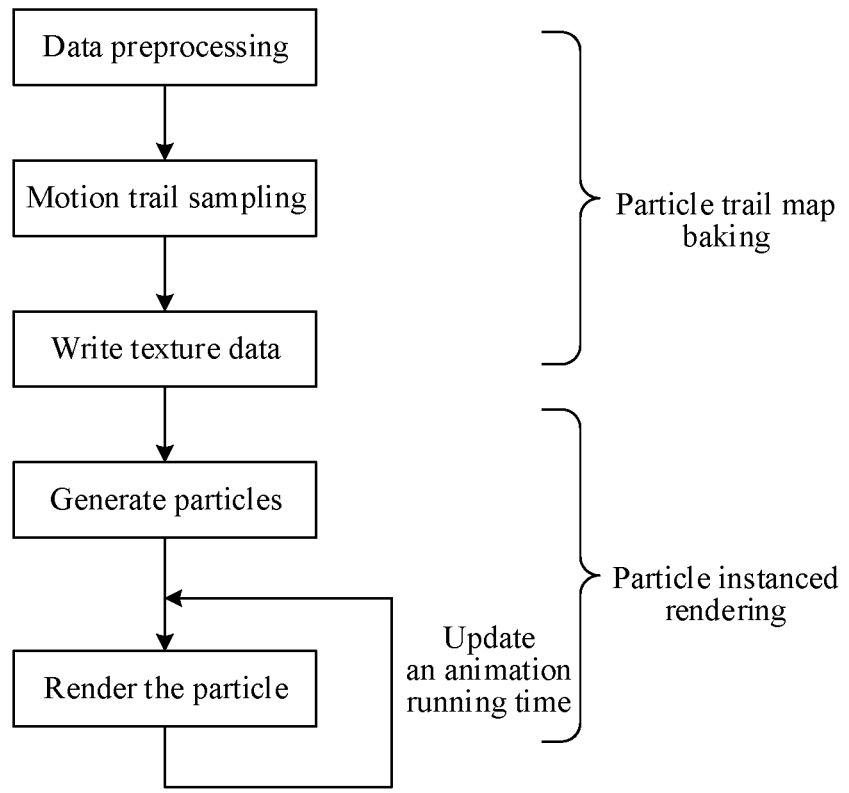
FIG. 8 is a schematic diagram of an overall implementation process of an image rendering method according to an embodiment of this disclosure.

As shown in FIG. 8, in a particle trail map baking phase, after data preprocessing, it is needed to perform sampling on a particle motion trail supported by road sections to obtain the location data of each reference sampling point on each road section, and then write the location data of each reference sampling point on each road section to a texture to obtain texture data corresponding to a particle road condition map.

Specifically, when a client renders the particle road condition map, it is needed to redraw the picture of the particle road condition map at a certain frame rate to achieve the effect of particle flow, and the location of the particle in each frame of picture is changed. The process may be actually understood as sampling on the particle motion trail at a certain frame rate. In the embodiment of this disclosure, sampling calculation is advanced to a data parsing phase to be completed at one time, and data is written to the texture for saving. The process is the particle trail map baking.

It is needed to perform data loading and data preprocessing before baking, and the data preprocessing may include data decompression, merging, and other processing processes. After the data preprocessing, a route data set linelist is obtained, where the route data set linelist includes route data (line) corresponding to each road section in the particle road condition map, the route data (line) includes the road condition information t of the road section, and the location data (path) of a plurality of waypoints sequentially arranged on the road section, the road condition information t is used for reflecting the traffic state of the road section, such as being smooth, slow, and congested, and the location data (path) of the plurality of waypoints may be represented as $[p_0x, p_0y, p_1x, p_1y, \ldots, p_nx, p_ny]$, i.e., x coordinates and y coordinates of the plurality of waypoints $p_0, p_1, \ldots, p_n$ are sequentially arranged.

Next, each road section in the route data set linelist is traversed, the particle motion trail supported by each road section is sampled, and falling point coordinates are calculated at a specific frequency on the particle motion trail supported by the road section.

During specific implementation, a sampling frequency F may be first determined. For example, a frame rate of 30 FPS of smooth animation may be used as the sampling frequency F, that is, sampling 30 times per second. Then, a particle motion velocity v corresponding to the road section is determined, where the particle motion velocity v may be determined according to the road condition information t of the road section. For example, the particle motion velocity v corresponding to the road condition information t used for representing a smooth road section may be 80 pixels/s, and the particle motion velocity v corresponding to the road condition information t used for representing a congested road section may be 10 pixels/s, and a correspondence between the particle motion velocity and the road condition information may be set depending on an actual condition. Further, a sub road section formed by every two waypoints on the road section is traversed, and interpolation processing is performed on each sub road section to determine the location data of reference sampling points on each sub road section.

The following is an example of interpolating an $i^{th}$ sub road section formed by an $i^{th}$ waypoint $p_i$ and a $(i+1)^{th}$ waypoint $p_{i+1}$, and a calculation manner of the location data of each reference sampling point on the $i^{th}$ sub road section is described.

First, a length $length_i$ of the $i^{th}$ sub road section is calculated through the following equation. In the following equation, $p_ix$ and $p_iy$ are the abscissa and ordinate of the waypoint $p_i$, and $p_{i+1}x$ and $p_{i+1}y$ are respectively the abscissa and ordinate of the waypoint $p_{i+1}$.

$$length_i = \sqrt{(p_{i+1}x - p_ix)^2 + (p_{i+1}y - p_iy)^2}$$

Then, a quantity of reference sampling points Ni on the $i^{th}$ sub road section is calculated through the following equation.

$$N_i = \frac{length_i}{\Delta D} = \frac{length_i * F}{v}$$

Further, $N_i$ falling points (i.e., the reference sampling points) are obtained through interpolation on the $i^{th}$ sub road section by using the following equation, and a value of subscript j in the following equation is from 0 to $N_{i-1}$.

$$p_{ij}x = p_ix * \frac{N-j}{N} + p_{i+1}x * \frac{j}{N}$$

$$p_{ij}y = p_iy * \frac{N-j}{N} + p_{i+1}y * \frac{j}{N}$$

Finally, the reference sampling points on all road sections in the particle road condition map are sequentially arranged to obtain the motion trail of the particles in the particle road condition map, i.e., $[p_{00}, p_{01}, p_{02}, \ldots, p_{ij}, \ldots]$.

After obtaining the location data of the reference sampling points in the particle motion trail in the aforementioned manner, it is needed to write the obtained location data of the reference sampling points into the texture. In consideration of the rendering performance of massive particles, it is generally needed to write the location data of the reference sampling points on all particle motion trails into one texture, and specific implementation is as follows:

First, initial texture data, and a reference location data sequence matched with a size of the initial texture data are created. Specifically, if a width of the initial texture data is w and a height is h, a quantity of texels that the initial texture data can carry is size=w*h. Because each texel is expressed by four 8-bit unsigned integer numbers of RGBA, the created reference location data sequence is as follows:

pointArray=new Uint8ClampedArray(w*h*4)

All particle motion trails are traversed, the location data of the reference sampling points on the particle motion trail is sequentially written into the aforementioned reference location data sequence, and then the reference location data sequence is converted into corresponding texture data. Exemplarily, when the data in the particle road condition map is loaded in the unit of a tile, x and y of each reference sampling point $p_{ij}$ on the particle motion trail have a value range of [−128, 383], and need to be encoded with four 8-bit bits for storage. That is, one texel stores the location coordinate values of one reference sampling point, and the specific manner of converting the location data into the RGBA channel values of the texel is as follows:

$x'=x+128, y'=y+128$ $r=x'>256?\ (x'-256):\ 0$ $g=x'>256?\ 256:\ x'$ $b=y'>256?\ (y'-256):\ 0$ $a=y'>256?\ 256:\ y'$

In addition, it is also needed to record the start point offset (start) of each road section in the reference location data sequence. For example, the locations of the RGBA channel values corresponding to a first reference sampling point on each particle motion trail in the reference location data sequence are recorded as the start point offset (start) corresponding to the road section to which the particle motion trail belongs.

As shown in FIG. 8, in a particle instanced rendering phase, particle rendering is performed by using a quadrilateral as a basic mesh surface, supplemented by a two-dimensional map, so as to construct a particle shape, where the basic mesh surface is shared by all particles in the particle road condition map. During rendering of the picture of the particle road condition map, it is also needed to render the particle according to the instance data of each particle, where the instance data of the particle may include the color of the particle and the location data of the particle at an animation running time corresponding to the picture, and the location data is determined according to a trail of the road section to which the particle belongs, the particle motion velocity, and the initial offset of the particle.

Because it is needed to update the location of the particle in each frame of picture due to the effect of particle flow, it is needed to transmit, before rendering each frame of picture, the animation running time corresponding to the picture to a GPU, further perform texture addressing by combining the previously generated texture data corresponding to the particle road condition map so as to find the corresponding texel data, and inversely decode the location data of the particle at the animation running time corresponding to the picture. Specific implementation is as follows:

First, the offset offsetNow of the particle at the animation running time is calculated through the following equation according to the animation running time t, the particle motion velocity v corresponding to the road section to which the particle belongs, and the initial offset of the particle:

offsetNow=offset+v*t

Then, a remainder operation is performed on the length of the road section to which the particle belongs by using the offset offsetNow of the particle at the animation running time so as to obtain a target offset of the particle on the road section to which the particle belongs, where the remainder operation is used for supporting the cyclic motion of the particle on the road section to which the particle belongs:

offsetNow'=offsetNow % length

Next, the target offset offsetNow' is divided by a sampling interval distance ΔD on the road section to which the particle belongs to obtain an index value (step) of the texel corresponding to the target offset offsetNow' in the texels on the road section:

$$step = \frac{offsetNow'}{\Delta D} = \frac{offsetNow' * F}{v}$$

Hereinafter, the column index (column) and row index (row) of the texel corresponding to the target offset offsetNow' in the texture data are calculated through the following equations according to the start point offset (start) corresponding to the road section to which the particle belongs and the width of the texture:

$$column = (start + step)\% \ w$$

$$row = floor\left(\frac{start + step}{w}\right)$$

Further, sub-pixel offset processing is separately performed in a horizontal direction and a longitudinal direction, and normalization is performed to obtain texture coordinates u and v of a target texel, where the location data carried by the target texel is very close to the location data at the target offset on the road section:

$$u = \frac{column + 0.5}{w}$$

$$v = \frac{row + 0.5}{h}$$

Finally, texture bilinear interpolation processing is performed on the texel data of the target texel to obtain interpolated texel data, and the interpolated texel data is decoded to obtain the location data of the particle at the animation running time.

For the image rendering method described above, this disclosure further provides a corresponding image rendering apparatus, such that the image rendering method can be actually applied and implemented.

Figure 9:
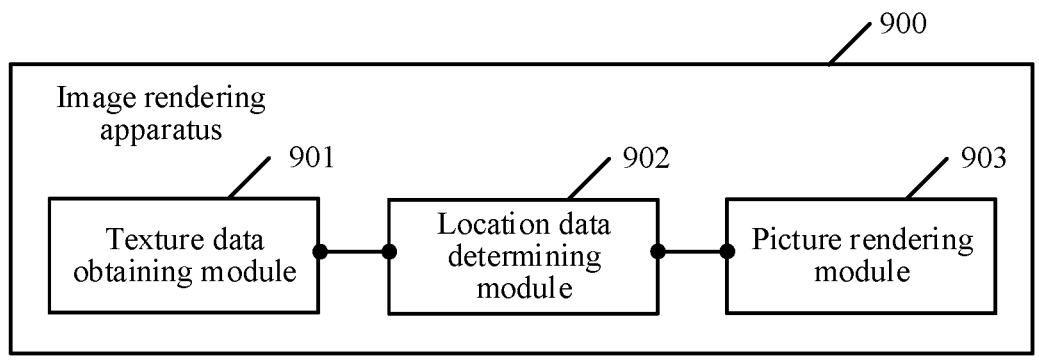
FIG. 9 is a schematic structural diagram of an image rendering apparatus according to an embodiment of this disclosure.

FIG. 9 is a schematic structural diagram of an image rendering apparatus 900 corresponding to the image rendering method shown in FIG. 2 above. As shown in FIG. 9, the image rendering apparatus 900 includes:

a texture data obtaining module 901, configured to obtain texture data corresponding to a particle road condition map, the texture data including texel data corresponding to each road section in the particle road condition map, and the texel data being used for carrying location data of reference sampling points on a corresponding road section thereof;

a location data determining module 902, configured to determine, during rendering of each frame of picture of the particle road condition map, location data of each particle in the particle road condition map at an animation running time according to the animation running time corresponding to the picture and the texel data in the texture data; and a picture rendering module 903, configured to render the picture corresponding to the animation running time in the particle road condition map according to the location data of each particle in the particle road condition map at the animation running time.

Figure 10:
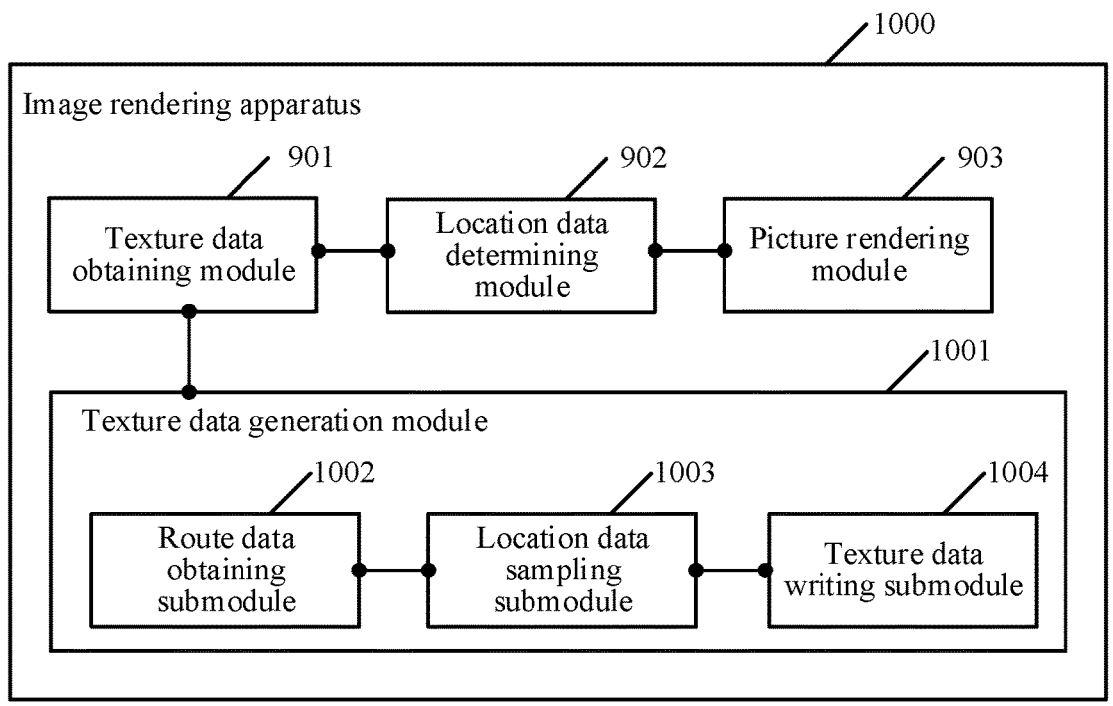
FIG. 10 is a schematic structural diagram of another image rendering apparatus according to an embodiment of this disclosure.

On the basis of the image rendering apparatus in FIG. 9, FIG. 10 is a schematic structural diagram of another image rendering apparatus 1000 according to an embodiment of this disclosure. As shown in FIG. 10, the image rendering apparatus 1000 further includes: a texture data generation module 1001. The texture data generation module 1001 specifically includes:

a route data obtaining submodule 1002, configured to obtain a route data set corresponding to a particle road condition map, the route data set including route data corresponding to each road section in the particle road condition map, and the route data including road condition information of the road section and location data of a plurality of waypoints sequentially arranged on the road section;

a location data sampling submodule 1003, configured to determine, for each road section in the particle road condition map, the location data of each reference sampling point on the road section according to a reference frame rate and the route data corresponding to the road section; and a texture data writing submodule 1004, configured to write the location data of each reference sampling point on each road section in the particle road condition map into initial texture data to obtain texture data corresponding to the particle road condition map.

In an embodiment, on the basis of the image rendering apparatus shown in FIG. 10, the location data sampling submodule 1003 is specifically configured to:

determine each sub road section on the road section and a length of the sub road section according to the location data of every two adjacent waypoints in the route data, start and end points of the sub road section respectively being two adjacent waypoints;

determine, for each sub road section on the road section, a quantity of the reference sampling points on the sub road section according to the length of the sub road section, the reference frame rate, and a particle motion velocity corresponding to the road section, the particle motion velocity being determined according to the road condition information in the route data; and determine, for each sub road section on the road section, the location data of each reference sampling point on the sub road section according to the location data of the start and end points of the sub road section and the quantity of the reference sampling points on the sub road section.

In an embodiment, on the basis of the image rendering apparatus shown in FIG. 10, the texture data writing submodule 1004 is specifically configured to:

create the initial texture data, a quantity of texels carried in the initial texture data being greater than or equal to a total quantity of the reference sampling points in the particle road condition map;

convert the location data of each reference sampling point on each road section in the particle road condition map to a reference channel value of the texels in the initial texture data to obtain a reference channel value corresponding to each reference sampling point; and sequentially write the reference channel value corresponding to each reference sampling point into a reference location data sequence, and generate the texture data corresponding to the particle road condition map according to the reference location data sequence.

In an embodiment, on the basis of the image rendering apparatus shown in FIG. 10, when the picture of the particle road condition map is rendered in a unit of a target size, the texture data writing submodule 1004 is specifically configured to:

create initial texture data corresponding to each sub road condition map, the sub road condition map being obtained by dividing the particle road condition map according to the target size;

convert, for each sub road condition map, the location data of each reference sampling point on each road section in the sub road condition map to the reference channel value of the texels in the initial texture data corresponding to the sub road condition map to obtain the reference channel value corresponding to each reference sampling point in the sub road condition map; and sequentially write, for each sub road condition map, the reference channel value corresponding to each reference sampling point into the reference location data sequence corresponding to the sub road condition map, and generate the texture data corresponding to the sub road condition map according to the reference location data sequence corresponding to the sub road condition map.

In an embodiment, on the basis of the image rendering apparatus shown in FIG. 10, the texture data writing submodule 1004 is specifically configured to convert the reference channel value corresponding to the reference sampling point in any one of the following manners:

determining, for the location data of each reference sampling point, a red channel value and a green channel value of each texel according to horizontal location data in the location data, and determining a blue channel value and an alpha channel value of the texel according to longitudinal location data in the location data; and determining, for the location data of each reference sampling point, the red channel value and the green channel value of the texel according to the longitudinal location data in the location data, and determining the blue channel value and the alpha channel value of the texel according to the horizontal location data in the location data.

In an embodiment, on the basis of the image rendering apparatus shown in FIG. 10, the texture data generation module 1001 further includes:

a start point offset recording submodule, configured to determine, for each road section in the particle road condition map, start point offset corresponding to the road section in the reference location data sequence, and record a correspondence between the road section and the start point offset, the start point offset corresponding to the road section being a location of the reference channel value corresponding to a first reference sampling point on the road section in the reference location data sequence.

Figure 11:
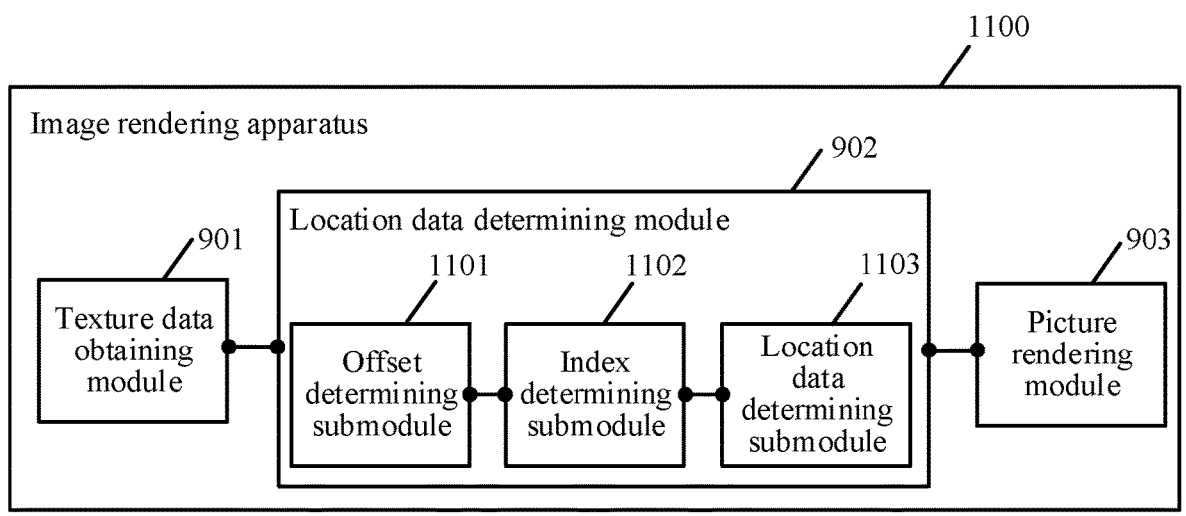
FIG. 11 is a schematic structural diagram of still another image rendering apparatus according to an embodiment of this disclosure.

On the basis of the image rendering apparatus in FIG. 9, FIG. 11 is a schematic structural diagram of another image rendering apparatus 1100 according to an embodiment of this disclosure. As shown in FIG. 11, the location data determining module 902 specifically includes:

an offset determining submodule 1101, configure to determine, for each particle in the particle road condition map, an offset of the particle at an animation running time according to the animation running time and an initial offset of the particle on the road section to which the particle belongs;

an index determining submodule 1102, configured to determine indexes of a target texel according to the offset of the particle at the animation running time, a frame rate of the particle road condition map, the road condition information of the road section to which the particle belongs, and the start point offset corresponding to the road section to which the particle belongs, the start point offset corresponding to the road section being used for indicating a distribution location of the location data of the reference sampling point belonging to the road section in the texture data; and a location data determining submodule 1103, configured to search the texture data for target texel data according to the indexes of the target texel, and determine the location data of the particle at the animation running time according to the target texel data.

In an embodiment, on the basis of the image rendering apparatus shown in FIG. 11, the index determining submodule 1102 is specifically configured to:

perform remainder operation on a length of the road section to which the particle belongs by using the offset of the particle at the animation running time, so as to determine a target offset;

determine an offset index of the particle according to the target offset, the frame rate of the particle road condition map, and a particle motion velocity corresponding to the road section to which the particle belongs, the particle motion velocity corresponding to the road section being determined according to the road condition information of the road section;

determine a horizontal index and a longitudinal index of a reference texel according to the offset index of the particle and the start point offset corresponding to the road section to which the particle belongs; and respectively perform sub-pixel offset processing on the horizontal index and the longitudinal index of the reference texel to obtain a horizontal index and a longitudinal index of the target texel.

In an embodiment, on the basis of the image rendering apparatus shown in FIG. 11, the location data determining submodule 1103 is specifically configured to:

perform texture bilinear interpolation processing according to the target texel data to obtain interpolation texel data; and perform conversion according to the interpolation texel data to obtain the location data of the particle at the animation running time.

In an embodiment, on the basis of the image rendering apparatus shown in FIG. 9, the picture rendering module 903 is specifically configured to:

obtain a target particle structure, the target particle structure being a basic structure shared by each particle in the particle road condition map; and render, for each particle in the particle road condition map, the particle in the picture according to the target particle structure and instance data corresponding to the particle, the instance data including the location data of the particle at the animation running time.

The embodiment of this disclosure provides the image rendering apparatus that innovatively uses a baked particle trail map to replace real-time location calculation during the rendering process of the particle road condition map, and the baked particle trail map is essentially the texture data corresponding to the particle road condition map. On this basis, in the embodiment of this disclosure, when rendering each frame of picture of the particle road condition map, there is no need to calculate the location data of all particles in the particle road condition map in real time, and the current location data of each particle in the particle road condition map can be directly determined based on the location data carried in the texel data in the texture data corresponding to the particle road condition map, so as to greatly reduce the computational overhead required by the CPU during the rendering process of the particle road condition map.

An embodiment of this disclosure further provides an electronic device for rendering an image. The electronic device may be specifically a terminal device or a server. The terminal device and the server according to the embodiment of this disclosure are described from the perspective of hardware materialization.

Figure 12:
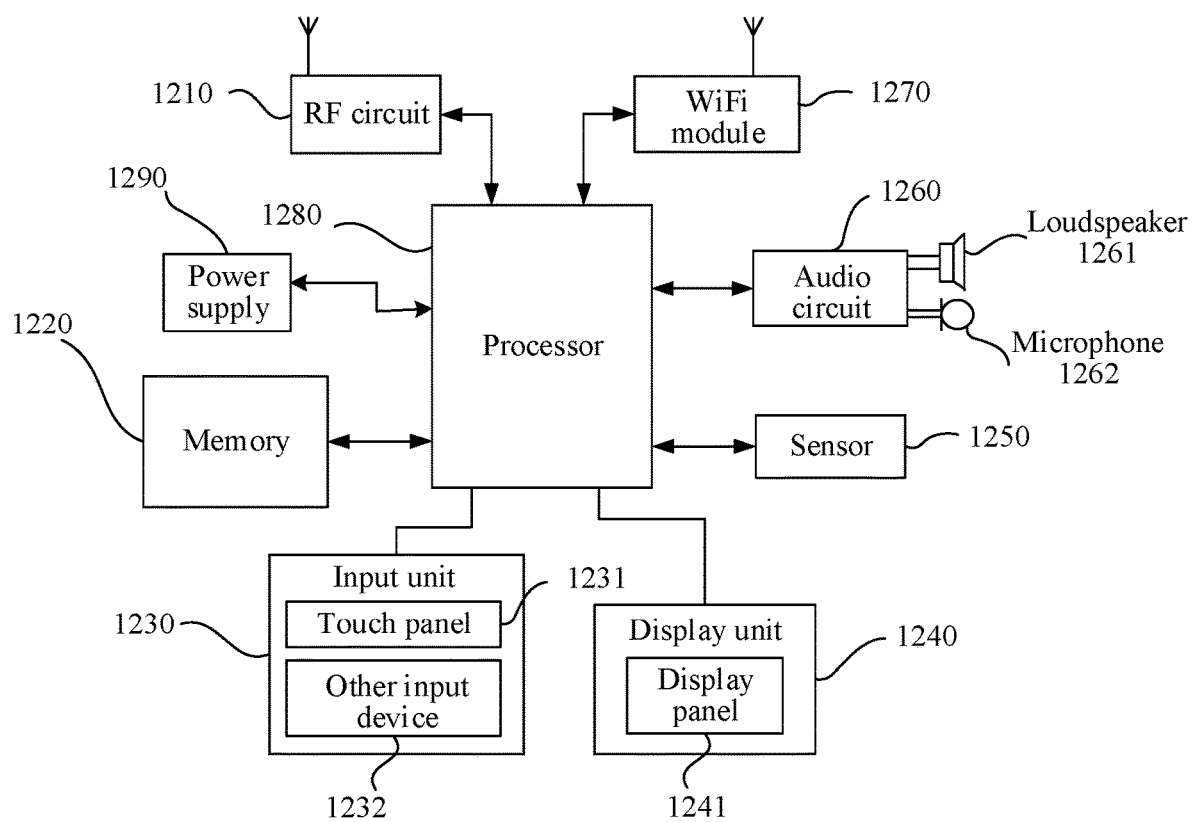
FIG. 12 is a schematic structural diagram of a terminal device according to an embodiment of this disclosure.

FIG. 12 is a structural block diagram of a terminal device according to an embodiment of this disclosure. As shown in FIG. 12, to facilitate description, only parts related to the embodiment of this disclosure are shown. For specific technical details that are not disclosed, reference may be made to the method embodiments of this disclosure. The terminal may be any terminal device including a mobile phone, a tablet computer, a personal digital assistant, a point of sales (POS) terminal, and a vehicle-mounted computer, and that the terminal is a computer is used as an example.

FIG. 12 is a block diagram of a partial structure of a computer related to a terminal according to an embodiment of this disclosure. With reference to FIG. 12, the computer includes: a radio frequency (RF) circuit 1210, a memory 1220 (non-transitory computer-readable storage medium), an input unit 1230 (including a touch panel 1231 and other input device 1232), a display unit 1240 (including a display panel 1241), a sensor 1250, an audio circuit 1260 (which may be connected to a loudspeaker 1261 and a microphone 1262), a Wi-Fi module 1270, a processor 1280 (processing circuitry), and a power supply 1290, etc. A person skilled in the art can understand that the structure of the computer shown in FIG. 12 does not constitute a limitation on the computer, and may include more or fewer parts than those shown in the figure, or combine certain parts, or include different part arrangements.

The memory 1220 may be configured to store a software program and modules. The processor 1280 executes various function applications and data processing of the computer by running the software program and the modules stored in the memory 1220. The memory 1220 may mainly include a program storage area and a data storage area. The program storage area may store an operating system, an application program that is required by at least one function (for example, a voice playback function and an image playback function), and the like. The data storage area may store data (for example, audio data and an address book) created according to use of the computer, and the like. In addition, the memory 1220 may include a high-speed random access memory, and may also include a non-volatile memory, for example, at least one magnetic disk storage device, a flash memory device, or another volatile solid-state storage device.

The processor 1280 is a control center of the computer, and uses various interfaces and circuits to connect all parts of the entire computer. By running or executing the software program and/or the modules stored in the memory 1220 and calling data stored in the memory 1220, the processor performs various functions and data processing of the computer, so as to perform overall monitoring on the computer. The processor 1280 may include one or more processing units. The processor 1280 may integrate an application processor and a modem processor. The application processor mainly processes the operating system, a user interface, the application program, and the like. The modem processor mainly processes wireless communication. It is to be understood that the foregoing modem processor may not be integrated into the processor 1280, either.

In the embodiment of this disclosure, the processor 1280 included in the terminal is further configured to execute the steps of any implementation of the image rendering method according to the embodiments of this disclosure.

Figure 13:
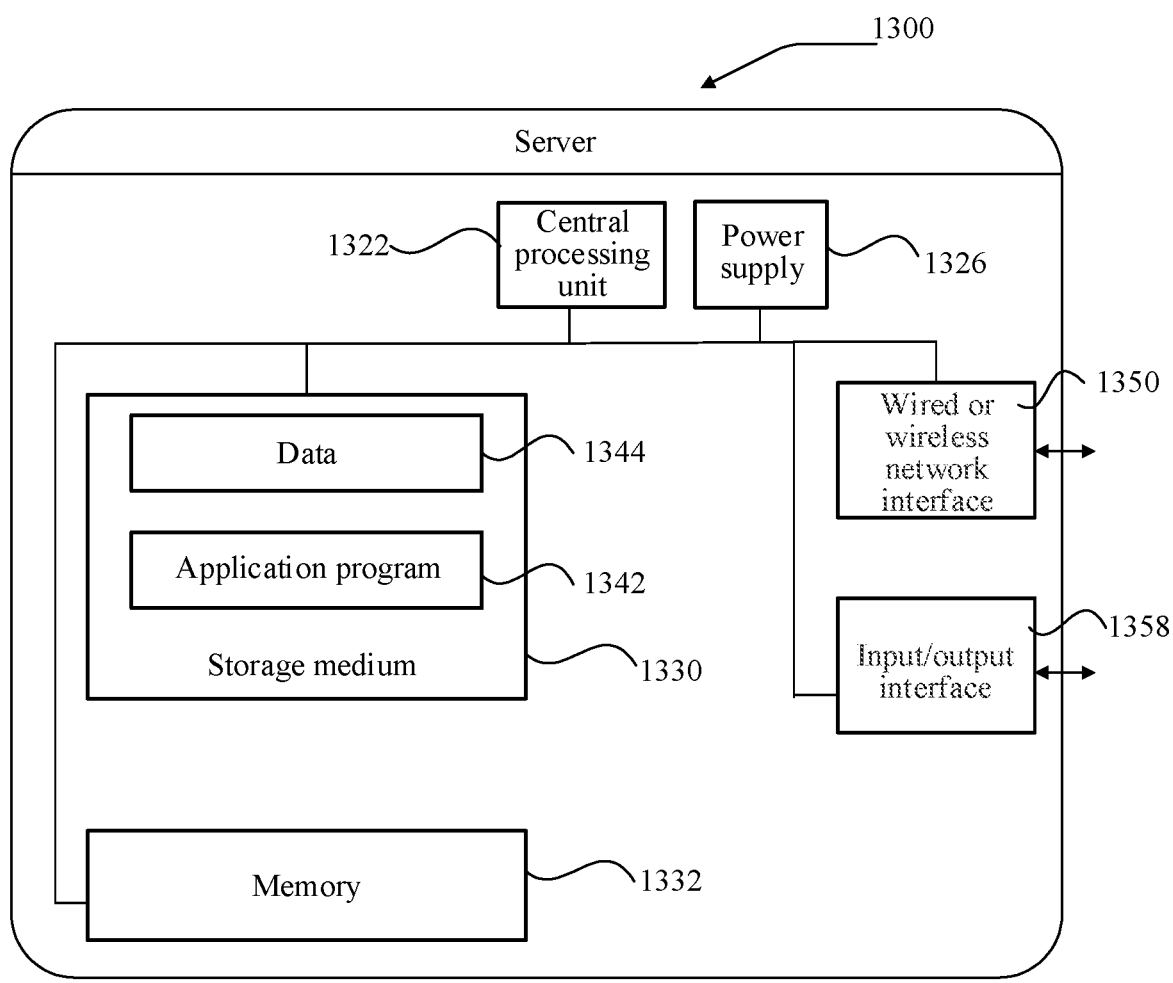
FIG. 13 is a schematic structural diagram of a server according to an embodiment of this disclosure.

FIG. 13 is a schematic structural diagram of a server 1300 according to an embodiment of this disclosure. The server 1300 may greatly vary due to different configurations or performance, may include one or more central processing units (CPUs) 1322 (for example, one or more processors), a memory 1332, and one or more storage mediums 1330 (for example, one or more mass storage devices) storing an application program 1342 or data 1344. The memory 1332 and the storage medium 1330 may be used for temporary storage or persistent storage. The program stored in the storage medium 1330 may include one or more modules (not shown in the figure), and each module may include a series of instruction operations on the server. Further, the CPU 1322 may be set to communicate with the storage medium 1330, and perform, on the server 1300, the series of instruction operations in the storage medium 1330.

The server 1300 may further include one or more power supplies 1326, one or more wired or wireless network interfaces 1350, one or more input/output interfaces 1358, and/or one or more operating systems, such as Windows Server™, Mac OS X™, Unix™, Linux™, FreeBSD™.

The steps executed by the server in the foregoing embodiment may be based on the server structure shown in FIG. 13.

The CPU 1322 is further configured to execute the steps of any implementation of the image rendering method according to the embodiments of this disclosure.

According to an embodiment of this disclosure, a computer-readable storage medium is provided. The computer program is configured to store a computer program, and configured to execute the steps of any implementation of the image rendering method according to the foregoing embodiments.

According to an embodiment of this disclosure, a computer program product or a computer program is further provided. The computer program product or the computer program includes a computer instruction that is stored in a computer-readable storage medium. A processor of a computer device reads the computer instruction from the computer-readable storage medium, and executes the computer instruction, to cause the computer device to execute any implementation of the image rendering method according to the foregoing embodiments of this disclosure.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The foregoing disclosure includes some exemplary embodiments of this disclosure which are not intended to limit the scope of this disclosure. Other embodiments shall also fall within the scope of this disclosure.

What is claimed is:

1. An image rendering method, comprising:
    obtaining texture data corresponding to a particle road condition map in which particle movement simulates vehicle movement reflecting road traffic conditions, the texture data being determined, for each road section in the particle road condition map, based on pre-generated location data of each reference sampling point on the respective road section based on a frame rate and a particle motion trail defined by a plurality of coordinates of the respective road sections, the texture data comprising texel data corresponding to each road section in the particle road condition map, and the texel data including the location data of the reference sampling points on the corresponding road section in the particle road condition map;
    determining, during rendering of each frame of the particle road condition map, location data of each particle in the particle road condition map according to an animation running time corresponding to the respective frame and according to the location data of the reference sampling points; and
    rendering the respective frame corresponding to the animation running time in the particle road condition map according to the location data of each particle at the animation running time.

2. The method according to claim 1, further comprising generating the texture data by:
    obtaining a route data set corresponding to the particle road condition map, the route data set comprising route data corresponding to each road section in the particle road condition map, and the route data of each road section comprising road condition information of the respective road section and the location data of the plurality of coordinates sequentially arranged on the respective road section;
    determining, for each road section in the particle road condition map, the location data of each reference sampling point on the respective road section according to the frame rate and according to the particle motion trail defined by the plurality of coordinates of the respective road section; and
    writing the location data of each reference sampling point on each road section in the particle road condition map into initial texture data to obtain the texture data corresponding to the particle road condition map.

3. The method according to claim 2, wherein the determining the location data of each reference sampling point on the respective road section according to the frame rate and the particle motion trail comprises:
    defining sub road sections on the respective road section and a length of the sub road sections according to location data of different sets of adjacent coordinates in the route data, start and end points of each sub road section respectively being a different set of two adjacent coordinates in the route data;
    determining, for each sub road section on the respective road section, a quantity of the reference sampling points on the respective sub road section according to the length of the respective sub road section, the frame rate, and a particle motion velocity corresponding to the respective road section, the particle motion velocity being determined according to the road condition information in the route data; and
    determining, for each sub road section on the respective road section, the location data of each reference sampling point on the respective sub road section according to the start and end points of the respective sub road section and the quantity of the reference sampling points on the respective sub road section.

4. The method according to claim 2, wherein the writing the location data comprises:
    creating the initial texture data, a quantity of texels included in the initial texture data being greater than or equal to a total quantity of the reference sampling points in the particle road condition map;
    converting the location data of each reference sampling point on each road section in the particle road condition map to a channel value of the texels in the initial texture data to obtain the channel value corresponding to each reference sampling point; and
    sequentially writing the channel value corresponding to each reference sampling point into a reference location data sequence, and generating the texture data corresponding to the particle road condition map according to the reference location data sequence.

5. The method according to claim 4, wherein
    each frame of the particle road condition map is rendered in a unit of a target size,
    the creating the initial texture data comprises:
    creating the initial texture data corresponding to plural sub road condition maps, the sub road condition maps being obtained by dividing the particle road condition map according to the target size;
    the converting the location data of each reference sampling point on each road section comprises:
    converting, for each sub road condition map, the location data of each reference sampling point on each road section in the respective sub road condition map to the channel value of the texels in the initial texture data corresponding to the respective sub road condition map to obtain the channel value corresponding to each reference sampling point in the respective sub road condition map; and the sequentially writing the channel value comprises:
sequentially writing, for each sub road condition map, the channel value corresponding to each reference sampling point into the reference location data sequence corresponding to the respective sub road condition map, and generating the texture data corresponding to the respective sub road condition map according to the reference location data sequence corresponding to the respective sub road condition map.

6. The method according to claim 4, wherein the converting the location data of each reference sampling point on each road section in the particle road condition map to the channel value comprises one of:
determining, for the location data of each reference sampling point, a red channel value and a green channel value of each texel according to horizontal location data in the location data of the respective reference sampling point, and determining a blue channel value and an alpha channel value of the respective texel according to longitudinal location data in the location data of the respective reference sampling point; or
determining, for the location data of each reference sampling point, the red channel value and the green channel value of the respective texel according to the longitudinal location data in the location data of the respective reference sampling point, and determining the blue channel value and the alpha channel value of the respective texel according to the horizontal location data in the location data of the respective reference sampling point.

7. The method according to claim 4, further comprising:
determining, for each road section in the particle road condition map, start point offset corresponding to the respective road section in the reference location data sequence, and recording a correspondence between the respective road section and the start point offset, the start point offset corresponding to the respective road section indicating a location of a channel value corresponding to a first reference sampling point on the respective road section in the reference location data sequence.

8. The method according to claim 7, wherein the determining the location data of each particle in the particle road condition map comprises:
for each particle in the particle road condition map,
determining, an offset of the respective particle at the animation running time according to the animation running time and an initial offset of the respective particle on a road section to which the respective particle belongs;
determining a target texel according to the offset of the respective particle at the animation running time, the frame rate of the particle road condition map, the road condition information of the road section to which the respective particle belongs, and the start point offset corresponding to the road section to which the respective particle belongs; and
searching the texture data for target texel data according to the target texel, and determining the location data of the respective particle at the animation running time according to the target texel data.

9. The method according to claim 8, wherein the determining the target texel comprises:
performing remainder operation on a length of the road section to which the respective particle belongs by using the offset of the respective particle at the animation running time so as to determine a target offset;
determining an offset index of the respective particle according to the target offset, the frame rate of the particle road condition map, and a particle motion velocity corresponding to the road section to which the respective particle belongs, the particle motion velocity corresponding to the road section being based on the road condition information of the road section to which the respective particle belongs;
determining a horizontal index and a longitudinal index of a reference texel according to the offset index of the respective particle and the start point offset corresponding to the road section to which the respective particle belongs; and
respectively performing sub-pixel offset processing on the horizontal index and the longitudinal index of the reference texel to obtain a horizontal index and a longitudinal index of the target texel.

10. The method according to claim 8, wherein the determining the location data of the respective particle at the animation running time according to the target texel data comprises:
performing texture bilinear interpolation processing according to the target texel data to obtain interpolation texel data; and
performing conversion according to the interpolation texel data to obtain the location data of the respective particle at the animation running time.

11. The method according to claim 2, wherein
the determining and the rendering is executed by a graphics processing unit (GPU), and the texture data corresponding to the particle road condition map is generated by a central processing unit (CPU); and
the obtaining the texture data corresponding to the particle road condition map comprises:
obtaining, by the GPU, the texture data corresponding to the particle road condition map generated and transmitted by the CPU.

12. The method according to claim 1, wherein the rendering the frame comprises:
obtaining a particle structure, the particle structure being a basic structure shared by each particle in the particle road condition map; and
rendering, for each particle in the particle road condition map, the respective particle in the respective frame according to the particle structure and instance data corresponding to the respective particle, the instance data comprising the location data of the respective particle at the animation running time.

13. An image rendering apparatus, comprising:
processing circuitry configured to
obtain texture data corresponding to a particle road condition map in which particle movement simulates vehicle movement reflecting road traffic conditions, the texture data being determined, for each road section in the particle road condition map, based on pre-generated location data of each reference sampling point on the respective road section based on a frame rate and a particle motion trail defined by a plurality of coordinates of the respective road sections, the texture data comprising texel data corresponding to each road section in the particle road condition map, and the texel data including the location data of the reference sampling points on the corresponding road section in the particle road condition map;
determine, during rendering of each frame of the particle road condition map, location data of each particle in the particle road condition map according to an animation running time corresponding to the respective frame and according to the location data of the reference sampling points; and render the respective frame corresponding to the animation running time in the particle road condition map according to the location data of each particle at the animation running time.

14. The apparatus according to claim 13, wherein the processing circuitry is further configured to:

obtain a route data set corresponding to the particle road condition map, the route data set comprising route data corresponding to each road section in the particle road condition map, and the route data of each road section comprising road condition information of the respective road section and the location data of the plurality of coordinates sequentially arranged on the respective road section;

determine, for each road section in the particle road condition map, the location data of each reference sampling point on the respective road section according the frame rate and according to the particle motion trail defined by the plurality of coordinates of the respective road section; and write the location data of each reference sampling point on each road section in the particle road condition map into initial texture data to obtain the texture data corresponding to the particle road condition map.

15. The apparatus according to claim 14, wherein the processing circuitry is further configured to:

define sub road sections on the respective road section and a length of the sub road sections according to location data of different sets of adjacent coordinates in the route data, start and end points of each sub road section respectively being a different set of two adjacent coordinates in the route data;

determine, for each sub road section on the respective road section, a quantity of the reference sampling points on the respective sub road section according to the length of the respective sub road section, the frame rate, and a particle motion velocity corresponding to the respective road section, the particle motion velocity being determined according to the road condition information in the route data; and determine, for each sub road section on the respective road section, the location data of each reference sampling point on the respective sub road section according to the start and end points of the respective sub road section and the quantity of the reference sampling points on the respective sub road section.

16. The apparatus according to claim 14, wherein the processing circuitry is further configured to:

create the initial texture data, a quantity of texels included in the initial texture data being greater than or equal to a total quantity of the reference sampling points in the particle road condition map;

convert the location data of each reference sampling point on each road section in the particle road condition map to a channel value of the texels in the initial texture data to obtain the channel value corresponding to each reference sampling point; and sequentially write the channel value corresponding to each reference sampling point into a reference location data sequence, and generate the texture data corresponding to the particle road condition map according to the reference location data sequence.

17. The apparatus according to claim 16, wherein each frame of the particle road condition map is rendered in a unit of a target size, and the processing circuitry is further configured to:

create the initial texture data corresponding to plural sub road condition maps, the sub road condition maps being obtained by dividing the particle road condition map according to the target size;

convert, for each sub road condition map, the location data of each reference sampling point on each road section in the sub road condition map to the channel value of the texels in the initial texture data corresponding to the respective sub road condition map to obtain the channel value corresponding to each reference sampling point in the respective sub road condition map; and sequentially write, for each sub road condition map, the channel value corresponding to each reference sampling point into the reference location data sequence corresponding to the respective sub road condition map, and generate the texture data corresponding to the respective sub road condition map according to the reference location data sequence corresponding to the respective sub road condition map.

18. The apparatus according to claim 16, wherein the processing circuitry is further configured to:

determine, for the location data of each reference sampling point, a red channel value and a green channel value of each texel according to horizontal location data in the location data of the respective reference sampling point, and determine a blue channel value and an alpha channel value of the respective texel according to longitudinal location data in the location data of the respective reference sampling point; or determine, for the location data of each reference sampling point, the red channel value and the green channel value of the respective texel according to the longitudinal location data in the location data of the respective reference sampling point, and determine the blue channel value and the alpha channel value of the respective texel according to the horizontal location data in the location data of the respective reference sampling point.

19. The apparatus according to claim 16, wherein the processing circuitry is further configured to:

determine, for each road section in the particle road condition map, start point offset corresponding to the respective road section in the reference location data sequence, and record a correspondence between the respective road section and the start point offset, the start point offset corresponding to the respective road section indicating a location of a channel value corresponding to a first reference sampling point on the respective road section in the reference location data sequence.

20. A non-transitory computer-readable storage medium storing computer-readable instructions thereon, which, when executed by processing circuitry, cause the processing circuitry to perform an image rendering method, comprising:

obtaining texture data corresponding to a particle road condition map in which particle movement simulates vehicle movement reflecting road traffic conditions, the texture data being determined, for each road section in the particle road condition map, based on pre-generated location data of each reference sampling point on the respective road section based on a frame rate and a particle motion trail defined by a plurality of coordinates of the respective road sections, the texture data comprising texel data corresponding to each road section in the particle road condition map, and the texel data including the location data of the reference sampling points on the corresponding road section in the particle road condition map;

determining, during rendering of each frame of the particle road condition map, location data of each particle in the particle road condition map according to an animation running time corresponding to the respective frame and according to the location data of the reference sampling points; and rendering the respective frame corresponding to the animation running time in the particle road condition map according to the location data of each particle at the animation running time.

* * * * *